US012616941B2

(12) United States Patent
Frost et al.

(10) Patent No.: US 12,616,941 B2
(45) **Date of Patent: *May 5, 2026**

(54) SURFACE-MODIFIED POLYETHERSULFONE MEMBRANES AND METHOD OF MAKING THEREOF

(71) Applicant: Solventum Intellectual Properties Company, Maplewood, MN (US)

(72) Inventors: Sven Frost, Essen (DE); Frans A. Audenaert, Kaprijke (BE); Pierre-Alexandre Bourgeois, Essen (DE); Tim Wolf, Düsseldorf (DE)

(73) Assignee: Life Technologies Corporation, Carlsbad, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 17/772,572

(22) PCT Filed: Nov. 4, 2020

(86) PCT No.: PCT/IB2020/060395

§ 371 (c)(1),
(2) Date: Apr. 28, 2022

(87) PCT Pub. No.: WO2021/090217

PCT Pub. Date: May 14, 2021

(65) Prior Publication Data

US 2022/0395783 A1 Dec. 15, 2022

(30) Foreign Application Priority Data

Nov. 8, 2019 (EP) .................................... 19208127

(51) Int. Cl.

| | |
|---|---|
| ***B01D 67/00*** | (2006.01) |
| ***B01D 61/14*** | (2006.01) |
| ***B01D 69/02*** | (2006.01) |
| ***B01D 71/68*** | (2006.01) |
| ***C02F 1/44*** | (2023.01) |
| ***C08J 7/04*** | (2020.01) |

(52) U.S. Cl.

CPC ..... *B01D 67/00931* (2022.08); *B01D 61/145* (2013.01); *B01D 61/147* (2013.01); *B01D 67/009* (2013.01); *B01D 69/02* (2013.01); *B01D 71/68* (2013.01); *C02F 1/444* (2013.01); *C08J 7/0427* (2020.01); *B01D 2323/02* (2013.01); *B01D 2325/36* (2013.01); *C08J 2381/02* (2013.01); *C08J 2451/08* (2013.01)

(58) Field of Classification Search

None

See application file for complete search history.

(56) References Cited

U.S. PATENT DOCUMENTS

| | | | |
|---|---|---|---|
| 4,944,879 | A | 7/1990 | Steuck |
| 5,468,390 | A | 11/1995 | Crivello et al. |
| 6,852,769 | B2 | 2/2005 | Belfort et al. |
| 7,073,671 | B2 | 7/2006 | Charkoudian |
| 9,045,602 | B2 | 6/2015 | Thom et al. |
| 2009/0188857 | A1 | 7/2009 | Moore et al. |
| 2010/0210160 | A1 | 8/2010 | Hester et al. |
| 2011/0120941 | A1 | 5/2011 | Allen et al. |
| 2016/0236154 | A1 | 8/2016 | Dubois et al. |

FOREIGN PATENT DOCUMENTS

| | | | |
|---|---|---|---|
| CN | 106621851 | A | 5/2017 |
| CN | 106634276 | A | 5/2017 |
| CN | 107303470 | B | 7/2020 |
| KR | 20140096628 | A | 8/2014 |
| KR | 20140100317 | A | 8/2014 |
| WO | 2010108985 | A1 | 9/2010 |
| WO | 2011069050 | A1 | 6/2011 |
| WO | 2013114297 | A1 | 8/2013 |
| WO | 2014112689 | A1 | 7/2014 |
| WO | 2020003216 | A1 | 1/2020 |
| WO | 2021090215 | A1 | 5/2021 |
| WO | 2021090216 | A1 | 5/2021 |

OTHER PUBLICATIONS

Extended European Search Report received for EP Application No. 19208127.1, mailed on Apr. 21, 2020, 2 pages.
International Search Report for PCT Application No. PCT/IB2020/060395, mailed on Jan. 20, 2021, 5 pages.

*Primary Examiner* — Krishnan S Menon
(74) *Attorney, Agent, or Firm* — HYLTON-RODIC LAW PLLC

(57) ABSTRACT

The present disclosure is related to a polymeric membrane, comprising a modified surface obtained from coating with hydrophilic monomers and curing the hydrophilic monomers with actinic irradiation, preferably UV light, wherein the hydrophilic monomers comprise at least one amino moiety; at least one polyoxyalkylene unit; and at least one (meth)acrylate moiety.

13 Claims, No Drawings

SURFACE-MODIFIED POLYETHERSULFONE MEMBRANES AND METHOD OF MAKING THEREOF

CROSS REFERENCE TO RELATED APPLICATIONS

This application is a national stage filing under 35 U.S.C. 371 of PCT/IB2020/060395, filed Nov. 4, 2020, which claims the benefit of European Application No. 19208127.1, filed Nov. 8, 2019, the disclosure of which is incorporated by reference in its/their entirety herein.

FIELD

The present disclosure relates to hydrophilic microporous membranes comprising a modified surface. In addition, the present disclosure relates to a process for producing such hydrophilic membranes by modification of microporous membranes with certain hydrophilic monomers and actinic irradiation such as UV light. The present disclosure further relates to use of the modified membranes for filtration purposes of aqueous media.

BACKGROUND

Polymeric membranes such as aromatic polysulfones are widely used in industry as base material for micro- and ultrafiltration materials. In certain applications, it is desirable that the surface of the membranes is hydrophilic. For example, it may be desirable to obtain a low protein binding tendency. This may be the case in pharmaceutical applications such as filtration of media in biopharmaceutical processes where protein-containing solutions are processed.

In exemplary processes known in the art, the hydrophobic polyethersulfone (PES) is blended with hydrophilic polymers like polyvinylpyrrolidone (PVP), polyethyleneglycol (PEG) and sulfonated polyethersulfone (SPES) to render the membrane surface hydrophilic. However, leaching of the hydrophilic polymers out of the polymer matrix may lead to a decrease of the membrane hydrophilicity over time as well as to a contamination of the permeate stream. Accordingly, the scope and duration of the application of a certain membrane may be limited. On the one hand, this is relevant for applications where contamination of the filtrate with polymer compounds is generally undesired, which is particularly true for pharmaceutical processes. On the other hand, long-term hydrophilicity and thus high protein resistance is required to minimize the loss of target proteins (such as monoclonal antibodies), e.g. during the purification of biopharmaceuticals (e.g. sterile filtration).

Various efforts to fix hydrophilic polymers into a hydrophobic polymer matrix (such as a PES matrix) have been published. Similarly, it has been also tried to modify the PES membrane surface to obtain a certain hydrophilicity. For example, U.S. Pat. No. 9,045,602 B2 discloses a method for producing a microporous membrane wherein a polymer is fixed by means of irradiation with an E-beam onto the surface of the membrane. This membrane is described as intended to be used in hemodialysis, virus filtration and sterile filtration.

U.S. Pat. No. 5,468,390 describes the modification of an aryl polysulfone membrane using a photo-grafting process without the use of a photoinitiator. The membrane is UV-irradiated for a certain time at wavelengths of about 254 nm in the presence of hydrophilic vinyl monomers.

Similarly, U.S. Pat. No. 6,852,769 B2 discloses a method to modify a polymeric photoactive sulfone membrane in an attempt to reduce protein fouling. The method comprises dipping the sulfone membrane into a solution containing hydrophilic monomers and a chain transfer agent and exposing the membrane to UV radiation in the presence of a filter.

Without wanting to diminish the efforts known from the prior art, there still exists a need in the art for hydrophilic membranes exhibiting long-term hydrophilicity, show low protein adsorption even after exposition to extraction conditions, and which are therefore useful for various applications in micro- and nanofiltrations. Particularly desirable are hydrophilic membranes for biopharmaceutical applications. There also exists a need for an efficient process for producing such membranes.

SUMMARY

The present disclosure provides a polymeric membrane, comprising a modified surface obtained from coating with hydrophilic monomers and curing the hydrophilic monomers with actinic irradiation, preferably UV light, wherein the hydrophilic monomers comprise (i) at least one amino moiety;

(ii) at least one polyoxyalkylene unit; and (iii) at least one (meth)acrylate moiety.

The present disclosure further provides a process for producing a surface-modified polymeric membrane, comprising the following steps:

(I) Providing a polymeric membrane;

(II) Applying a solution comprising hydrophilic monomers to the polymeric membrane; and (III) Irradiating the polymeric membrane with actinic radiation, preferably UV light, wherein the hydrophilic monomers comprise (i) at least one amino moiety;

(ii) at least one polyoxyalkylene unit; and (iii) at least one (meth)acrylate moiety.

Furthermore, the present disclosure relates to certain uses in applications in filtration applications of liquid media. These applications comprise the purification of biopharmaceuticals and chemical pharmaceuticals, water, blood and beverages.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term “a”, “an”, and “the” are used interchangeably and mean one or more; and “and/or” is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of “at least one” includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of “consisting”, which is meant to be limiting, the use of “including,” “containing”, “comprising,” or “having” and variations thereof is meant to be not limiting and to encompass the items listed thereafter as well as additional items. It should be noted, however, that the use of "comprising" herein also encompasses the term of "consisting of", i.e. the use of "consisting of" in the sense of "consisting only of" is not excluded in the present disclosure per se.

Amounts of ingredients of a composition may be indicated by % by weight (or "% wt". or "wt.-%") unless specified otherwise. The amounts of all ingredients gives 100% wt unless specified otherwise. If the amounts of ingredients are identified by % mole the amount of all ingredients gives 100% mole unless specified otherwise.

Unless explicitly indicated, all preferred ranges and embodiments may be combined freely.

Parameters as described herein may be determined as described in detail in the experimental section.

The present disclosure provides a polymeric membrane, comprising a modified surface obtained from coating with hydrophilic monomers and curing the hydrophilic monomers with actinic irradiation, preferably UV light, wherein the hydrophilic monomers comprise (i) at least one amino moiety;

(ii) at least one polyoxyalkylene unit; and (iii) at least one (meth)acrylate moiety.

This structure, i.e. the modified surface obtained from the hydrophilic monomers as described herein, leads to a combination of features desirable for a number of polymeric membranes, in particular with respect to their intended applications. In particular, the polymeric membranes are provided with a stable hydrophilic surface. This has the effect that a low protein adsorption is achieved, which is very advantageous for filtration of aqueous media. This includes microfiltration and nanofiltration purposes. This may be the case for applications in which protein containing solutions or dispersions are being filtered. These applications may comprise filtration of beverages or filtration in pharmaceutical or biopharmaceutical as well as medical applications.

This structure, i.e. the combination of a modified surface comprising acrylate and/or methacrylate polymers and/or copolymers, wherein the modified surface extends at least over the first and/or the second surface, and over the pores of at least 50% of the thickness of the wall, leads to a combination of features such as a hydrophilic surface of the porous membrane and low extractables. As a consequence, the membranes according to the present disclosure may exhibit low protein binding tendency. That is, the polymeric membranes according to the present disclosures having this unique combination of features are particularly suited for microfiltration and nanofiltration purposes where a hydrophilic surface and low extractables are important. This may be the case for applications in which protein containing solutions or dispersions are being filtered. These applications may comprise filtration of beverages or filtration in pharmaceutical or biopharmaceutical as well as medical applications.

Generally, the membranes according to the present disclosure are porous polymeric membranes selected from sulfone membranes, polyethylene membranes, polypropylene membranes, polyvinylidene difluoride membranes and polyacrylonitrile membranes. Membranes selected from these materials generally exhibit desirable properties such as mechanical stability, chemical resistance as well as easy manufacturing according to processes well-established in the art. Polymeric sulfone membranes are preferably employed in the present disclosure due to their easy manufacture according to the processes as disclosed herein. Preferably, the sulfone polymer constituting the polymeric sulfone membrane is selected from polysulfone, polyethersulfone, polyphenylsulfone, polyarylethersulfone and polyarylsulfone, of which polyethersulfone (PES) and polysulfone are particularly preferred.

It is also preferred that the polymeric membrane further comprises at least one hydrophilic polymer. That is, for example, in addition to the comparatively hydrophobic sulfone polymer, the polymeric membrane may further comprise at least one hydrophilic polymer. This may increase the general hydrophilicity of the surface of the polymeric membrane, which is desirable for many applications. Preferably, the at least one hydrophilic polymer is selected from polyvinylpyrrolidone, polyethylenglycol, polyvinylalcohol, polyglycolmonoester, polysorbitate, carboxymethylcellulose or a modification or copolymer thereof, and any combinations and mixtures thereof. For example, a preferred and advantageous combination of hydrophilic polymer and sulfone polymer is polyvinylpyrrolidone and polyethersulfone polymer (PES). (For example, as the aromatic sulfone polymer in the context of the present disclosure, e.g. polysulfones, polyethersulfones, polyphenylene sulfones, polyarylethersulfones or copolymers or modifications of these polymers or mixtures of these polymers can be used. Preferably, the sulfone polymer is a polysulfone or a polyethersulfone with the repeating molecular units shown in formulas (I) and (II) as follows:

(I)

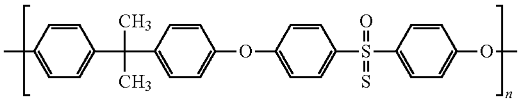

(II)

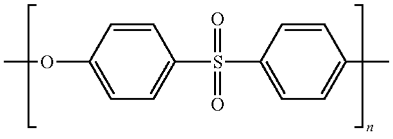

More preferably, a polyethersulfone according to formula (II) is used because this has lower hydrophobicity than, for example, the polysulfone.

Long-chain polymers are used advantageously as the hydrophilic second polymer that have a good compatibility with the hydrophobic sulfone polymer and have repeating polymer units that are in themselves hydrophilic. Preferred hydrophilic polymers have an average molecular weight $M_w$ of more than 10 000 Daltons. In the method according to the present disclosure, the polymers used as the hydrophilic second polymers have at the same time the function of increasing the viscosity of the homogeneous spinning solution, i.e. of functioning as a thickener, for which reason these polymers are also often called thickeners. In addition to this, these polymers function also as pore-forming agents or nucleating agents during the formation of the membrane structure. Preferably, the hydrophilic second polymer is polyvinylpyrrolidone, polyethylene glycol, polyvinyl alcohol, polyglycol monoester, polysorbitate, such as, e.g., polyoxyethylene sorbitan monooleate, carboxymethylcellulose, or a modification or a copolymer of these polymers. Polyvinylpyrrolidone is especially preferred. It is also possible to use mixtures of different hydrophilic polymers and, in particular, mixtures of hydrophilic polymers with different molecular weights, e.g., mixtures of polymers whose molecular weights differ by a factor of 5 or more. Preferably, the concentration of the hydrophilic second polymer in the membrane according to the present disclosure is in the range of from 0.5 to 7 wt. % relative to the weight of the membrane.

For the modification of the surface characteristics of the membranes according to the present disclosure, additives can be used that influence the stability of the membrane, the color, the ability to adsorb or absorb. There are also additives possible that control the charge of the membrane, e.g., that impart anionic or cationic character to the membrane. Preferably, the membrane according to the present disclosure further contains a hydrophilic third polymer that is different from the hydrophilic second polymer and is a hydrophilically modified aromatic sulfone polymer. Due to the presence of such a polymer, the permeability of the membrane as well as its adsorption characteristics are in particular favorably influenced and the membrane has permanent hydrophilic properties, which may manifest themselves in the fact that, among other things, the membrane can be repeatedly steam sterilized and its hydrophilic characteristics remain preserved, essentially unchanged, even after for example 30 sterilization cycles. Preferably, the hydrophilically modified aromatic sulfone polymer is present in the membranes as disclosed herein at a concentration in the range of from 1 to 50 wt.-% relative to the weight of the membrane, whereby the sum of the polymers yields 100%. Thereby, in the method for producing the preferred membranes as disclosed herein, the polymer component further comprises a hydrophilic third polymer that is different from the hydrophilic second polymer and is a hydrophilically modified aromatic sulfone polymer. Preferably, the casting solution contains the hydrophilically modified aromatic sulfone polymer homogeneously dissolved at a concentration in the range of from 0.2 to 20 wt.-% relative to the weight of the casting solution The hydrophilically modified aromatic sulfone polymer can be of a type in which hydrophilic functional groups are covalently bound to the sulfone polymer. It can also be a copolymer based on a sulfone polymer, in which hydrophilic segments are contained, for example a copolymer made from a sulfone polymer with a hydrophilic polymer like, e.g., polyvinylpyrrolidone or polyethylene glycol. For reasons of compatibility, it is of particular advantage, if the hydrophilically modified aromatic sulfone polymer is based on the hydrophobic first aromatic sulfone polymer, i.e., the membrane structure contains a mixture of a hydrophobic first aromatic sulfone polymer and a hydrophilic modification of this polymer. Good results may be achieved when the hydrophilically modified aromatic sulfone polymer is a sulfonated sulfone polymer, whereby this sulfonated sulfone polymer has preferably a degree of sulfonation in the range of from 3 to 10%. Membranes according to the present disclosure that contain a combination of polyethersulfone and sulfonated polyethersulfone have particularly high permeabilities for water and proteins as well as a low tendency for adsorption, e.g. of proteins, and therefore a low tendency for fouling. These properties may also be present in combination with a pH-triggered switching of properties, believed to be due to the presence of the at least one amino moiety.

The polymeric membranes as described herein have a first and a second surface and a wall extending between the first and second surface as well as pores on the first and second surfaces and throughout the wall. Thus, the polymeric membranes are preferably porous membranes and can either be flat sheet membranes or hollow-fibre membranes. Preferably, the membranes according to the present disclosure are flat sheet membranes.

The membranes according to the present disclosure comprise a modified surface. The modified surface is obtained coating the aforementioned membrane with hydrophilic monomers and curing said hydrophilic monomers with actinic irradiation, preferably UV light.

Preferably, the at least one polyoxyalkylene unit is selected from polyethers. Polyethers exhibit good chemical stability for the purposes envisaged herein and do usually not exhibit significant environmental or health concerns. A preferred example for polyether units is the category of polyethyleneglycols (PEG).

The hydrophilic monomers according to the present disclosure comprise at least one amino moiety. This gives rise to a certain hydrophilicity of the monomer itself, but also to the coating obtained therefrom. With regard to the at least one amino moiety, it is preferred that it is at least one secondary amino moiety and/or at least one tertiary amino moiety. Secondary and tertiary amino moieties are both chemically stable enough for the purposes envisaged herein. They also exhibit a reduced nucleophilicity compared to primary amino moieties (due to steric reasons), and are only susceptible to some extent to differing pH-values when immersing the coating obtained from the monomers in aqueous solutions. Preferably, the hydrophilic monomer as described herein comprises at least one secondary amino moiety. In this regard, it is preferred that the hydrophilic monomer comprises one secondary amino moiety, two secondary amino moieties, three secondary amino moieties, or four secondary amino moieties. It is also preferred that the monomer comprises at least one tertiary amino moiety. Preferably, the monomer comprises one tertiary amino moiety, two amino moieties, three amino moieties, or four tertiary amino moieties.

The hydrophilic monomer according to the present disclosure comprises at least one (meth)acrylate moiety. This presence of at least one (meth)acrylate moiety has the advantage that the hydrophilic monomer as disclosed herein may be easily polymerized or coated onto a variety of substrates by means of well-established techniques such as heating or by means of actinic irradiation. Preferably, the hydrophilic monomer comprises (meth)acrylate moieties in an amount of from 1 to 10, preferably from 1 to 8, more preferably from 1 to 6. (Meth)acrylate moieties in these amounts give rise to advantages such as good crosslinking properties, without compromising the chemical and mechanical stability of the coatings. That is, the (meth)acrylate moieties may be selected from methacrylate moieties and acrylate moieties, of which acrylate moieties are preferred due to their better performance. Preferably, the hydrophilic monomer comprises acrylate moieties in an amount of from 1 to 10, preferably from 1 to 8, more preferably from 1 to 6.

Preferably, the hydrophilic monomer according to the present disclosure is a monomer according to any one of formulae (I), (II), (III), (IV), (V), (VI), (VII), or (VIII)

Formula (I)
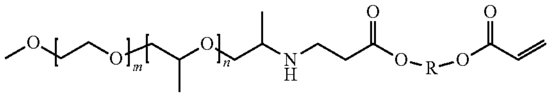
Formula (II)
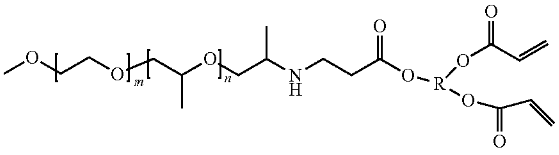
Formula (III)
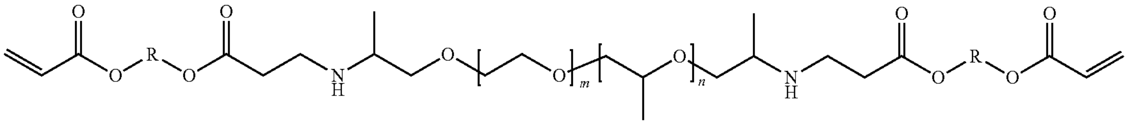
Formula (IV)
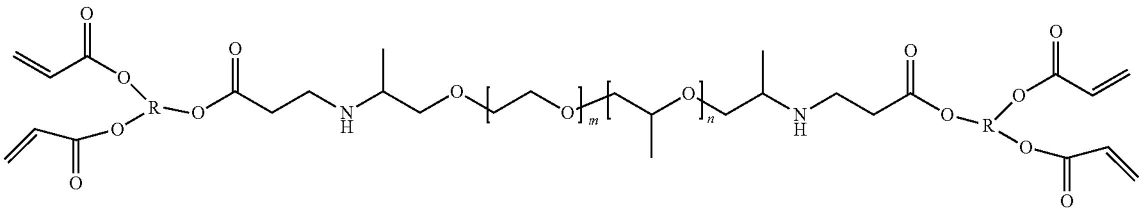
Formula (V)
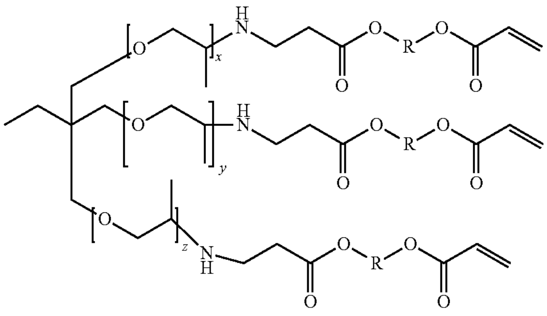
Formula (VI)
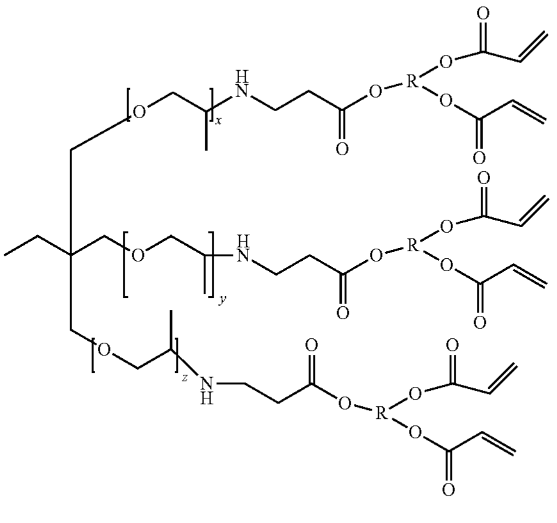
Formula (VII)
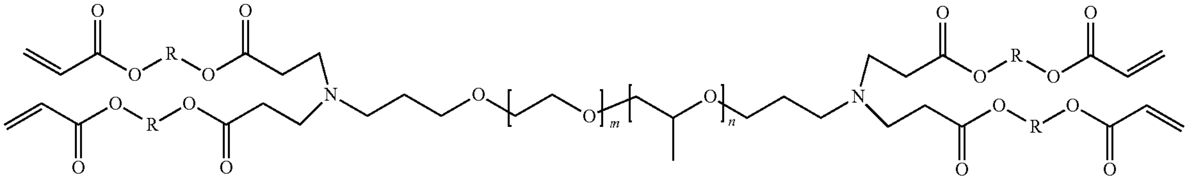

-continued

Formula (VIII)

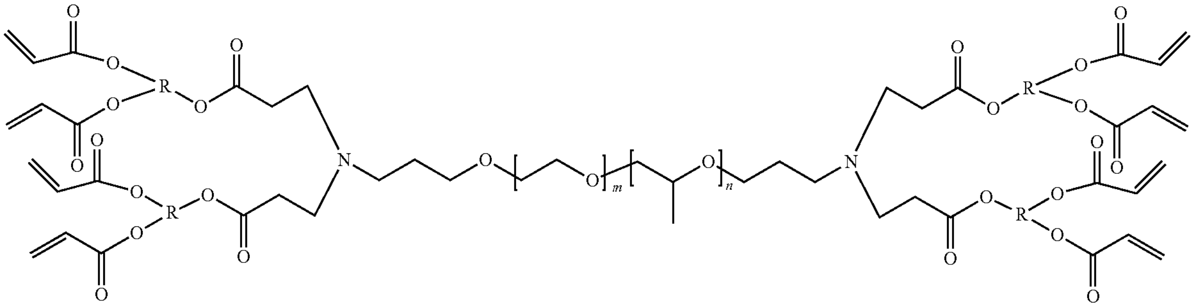

, wherein m and n may be different or the same, wherein m and n may each be in a range of from 1 to 100, wherein x, y and z may be different or the same, and may be in the range of from 1 to 100, wherein R is an organic residue, preferably selected from linear or branched alkyl or alkoxy residues. Preferably, m is in the range of from 1 to 70, more preferably from 1 to 50. Similarly, it is preferred that n is in the range of from 1 to 70, more preferably from 1 to 50. X is preferably in the range of from 1 to 70, more preferably from 1 to 50. Y is preferably in the range of from 1 to 70, more preferably from 1 to 50. Z is preferably in the range of from 1 to 70, more preferably from 1 to 50.

It is also preferred that wherein the hydrophilic monomer according to the present disclosure is a monomer according to any one of formulae (IX to XIV)

Formula (IX)

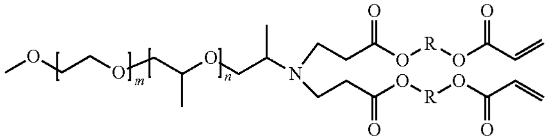

Formula (X)

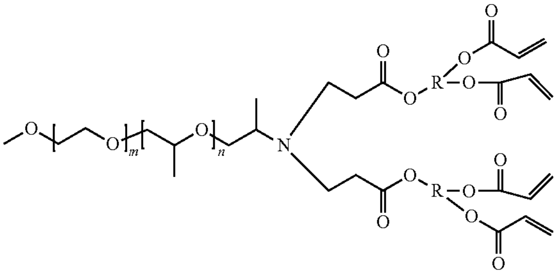

Formula (XI)

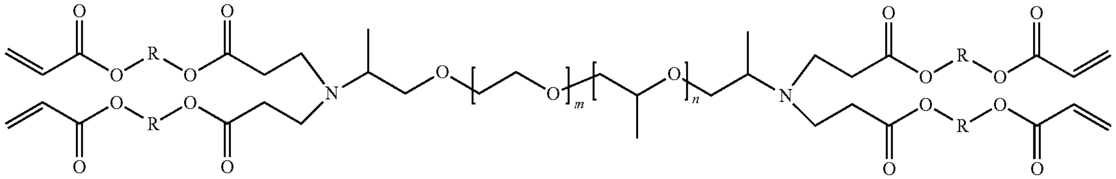

Formula (XII)

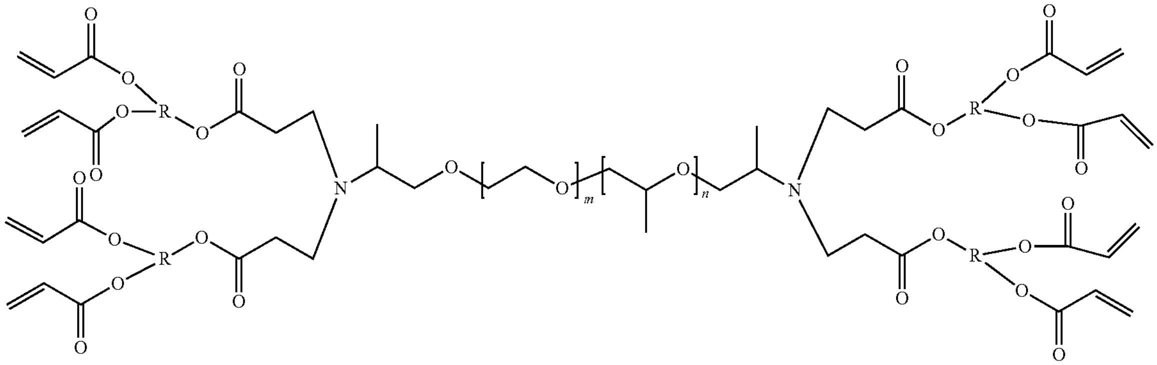

-continued

Formula (XIII)

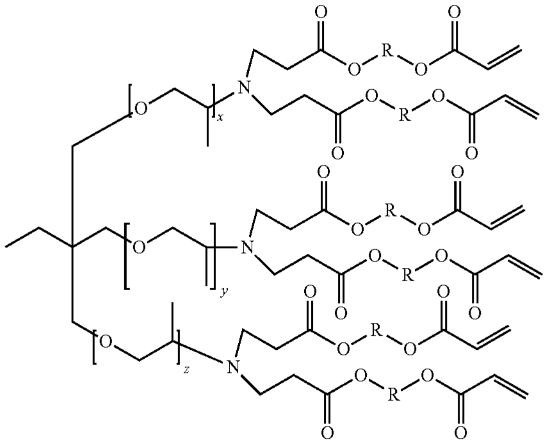

Formula (XIV)

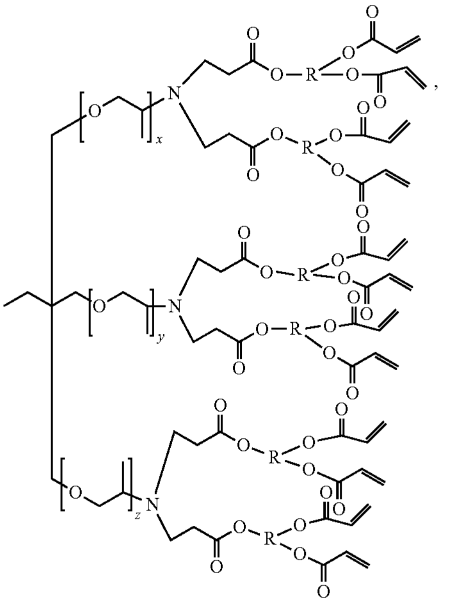

wherein m and n may be different or the same, wherein x, y and z may be different or the same, wherein m and n may each be in a range of from 1 to 100, and wherein R is an organic residue, preferably from linear or branched alkyl or alkoxy. Preferably, m is in the
range of from 1 to 70, more preferably from 1 to 50. Similarly, it is preferred that n is in the range of from 1 to 70, more preferably from 1 to 50. X is preferably in the range of from 1 to 70, more preferably from 1 to 50. Y is preferably in the range of from 1 to 70, more preferably from 1 to 50. Z is preferably in the range of from 1 to 70, more preferably from 1 to 50.

The hydrophilic monomer according to the present disclosure is preferably obtained from reacting at least one polyoxyalkylamine with at least one (meth)acrylate compound. Preferably, the at least one polyoxyalkylamine is selected from polyetheramines. It is preferred that the at least one polyoxyalkylamine, preferably the at least one polyetheramine, comprises ethoxy-units and propyloxy-units. In this regard, it is preferred that the polyoxyalkylamine, preferably the at least one polyetheramine comprises at least 5 ethoxy-units, preferably at least 10 ethoxy-units, and more preferably at least 12 ethoxy-units. It is also preferred that the polyoxyalkylamine, preferably the at least one polyetheramine, comprises less than 25 propyloxy-units, preferably less than 20 propyloxy-units, and more preferably less than 15 propyloxy-units. Preferably, the ratio of ethoxy-units to propyloxy-units is in the range of from 1 to 20, preferably from 1 to 15, and more preferably from 1 to 10. It is also preferred that the at last one polyoxyalkylamine, preferably the at least one polyetheramine, exhibits a molecular weight of at least 80 Dalton, preferably at least 100 Dalton, more preferably at least 200 Dalton. Preferably, that the at last one polyoxyalkylamine, preferably the at least one polyetheramine, exhibits a molecular weight of 8000 Dalton and less, preferably 7000 Dalton and less, and more preferably 6000 Dalton and less. Accordingly, it is preferred that the at last one polyoxyalkylamine, preferably the at least one polyetheramine, exhibits a molecular weight in the range of from 80 Dalton to 8000 Dalton, preferably from 100 Dalton to 7000 Dalton, and more preferably from 200 Dalton to 6000 Dalton. It is also preferred that the at last one polyoxyalkylamine, preferably the at least one polyetheramine, is either a monoamine, diamine, or triamine. Polyetheramines which may be advantageously used as the polyoxyalkylamine as described herein are commercially available e.g. from Huntsman under the tradename "Jeffamine®". Examples for Jeffamines® are M1000, M2070, ED900 and T403.

The at least one (meth)acrylate compound is preferably selected from di(meth)acrylates, tri(meth)acrylates, tetra(meth)acrylates, penta(meth)acrylates, and hexa(meth)acrylates. Mono(meth)acrylates will not yield the hydrophilic monomers as disclosed herein. Preferably, the (meth)acrylate compound is selected from diacrylates, triacrylates, tetraacrylates, pentaacrylates, and hexaacrylates. In this regard, it is preferred that the at least one acrylate compound is selected from alkyldiacrylates, alkyltriacrylates, alkyltetraacrylates, alkylpentaacrylates, alkylhexaacrylates, polyethylene glycol diacrylates, ethoxylated trimethylolpropane triacrylates, and trimethylolpropane triacryiate. Preferably, the at least one acrylate compound is selected from polyethylene glycol diacrylates, preferably having between 2 and 20 ethoxy units. Diacrylates which may be advantageously used for the purposes described herein are commercially available, for example, from Sartomer-Arkema under the trade designations SR 259, SR 344 and SR 610. It is also preferred that the ethoxylated trimethylolpropane triacrylates comprise ethoxy units in an amount of from 4 to 25, preferably between 5 to 23, more preferably between 6 and 20. Exemplary (ethoxylated) trimethylolpropane triacrylates for use herein may be obtained from Sakoma-Arkerna under the trade designation SR502 or SR9035 and from ECEM under the trade designation TMPEOTA.

The modified membrane according to the present disclosure is obtained from coating the membrane with the hydrophilic monomers as described herein and curing said monomers with actinic irradiation. Preferably, the actinic irradiation is UV light. Using actinic irradiation and in particular UV light for curing the hydrophilic monomers has the advantage that much less energy is required for curing than for e.g. thermal curing. Furthermore, curing with UV light is carried out at much lower temperatures than thermal curing. This is of particular importance as many polymeric materials used in polymeric membranes cannot withstand higher temperatures. Also, heating up to higher temperatures may already alter the delicate porous membrane structure, which is generally not desirable.

The modified surface of the polymeric membranes as disclosed herein may extend over the first and/or second surface, and over the walls and pores throughout the wall of at least 50%, preferably of at least 60%, more preferably of at least 70% and even more preferably of at least 80% of the thickness of the wall, starting from the first surface and/or the second surface. That is, the modified surface as described herein preferably does not only cover the first or second surface of the polymeric membrane, but also extends into the pores of the wall between those surfaces. This has the advantage that a larger part of the total surface of the porous membrane is covered by the modified surface. The larger the part of the total surface of the porous membrane is covered by the modified surface, the more pronounced the advantages with regard to increased hydrophilicity, decreased protein adsorption and decreased level of extractables of the membrane. Thus, it is preferred that the modified surface extends over the pores throughout the wall over a thickness of at least 50%, preferably of at least 60%, more preferably of at least 70% and even more preferably of at least 80% of the thickness of the wall, or of a thickness greater than 35 μm, preferably greater than 50 μm, more preferably greater than 75 μm, and even more preferably greater than 95 μm of the thickness of the wall, starting from the first surface and/or from the second surface. For example, in the case of a flat sheet membrane, the modified surface extends over the first surface and over the pores throughout the wall of at least 50%, preferably of at least 60%, more preferably of at least 70% and even more preferably of at least 80% of the thickness of the wall, or of at least 25 μm of the thickness of the wall, preferably greater than 35 μm, preferably greater than 50 μm, more preferably greater than 75 μm, and even more preferably greater than 95 μm of the thickness of the wall, starting from the first surface. In this regard, it is preferred that the modified surface extends over at least 5%, preferably at least 10%, more preferably at least 20%, and even more preferably at least 30% of the second surface.

More preferably, the modified surface may extend over the first surface, over the pores throughout the complete thickness of the wall, and over at least part of the second surface of the wall. For example, in the case of a commonly used porous PES flat-sheet membrane having a thickness of about 110 μm, the modified surface may extend over the first and second surfaces as well as over the complete thickness of the wall extending between the first and second surfaces.

The modification of the surface may be identified by means of ATR-IR analysis as described in more detail in the experimental section. For example, the absorbance of the C═O stretch vibration (e.g. at 1725 $cm^{-1}$) representing the polymethacrylates on the membrane first and/or second surfaces may be detected. This may also be compared to a corresponding membrane without a modified surface. For instance, if a flat sheet membrane was modified by irradiating it from the side of the first surface, and ATR-IR detects that also the second surface or at least part of it has been modified, then it is evident that also the surfaces of the pores extending on the complete thickness of the wall between the first and second surfaces has been modified. Thus, ATR-IR detection represents a direct method for determination of modification of the first and second surfaces, and allows for an indirect determination of the extend of the modified surface of the pores in the wall between the first and second surfaces. In addition, modification of the surface as described herein may be determined via a combination of microtome and IR-microscopy.

The polymeric membranes as described herein have surfaces exhibiting hydrophilic properties. Preferably, the surface of the polymeric membranes as described herein exhibit a positive zeta-potential at pH-values of less than 5, preferably less than 6, and preferably less than 7. Similarly, it is preferred that the surface of the polymeric membrane as described herein exhibits an isoelectric point at a pH-value in the range of from 4 to 9, preferably from 4.5 to 8.5, more preferably from 5 to 8. This has the advantage that the hydrophilic surface properties of the polymeric membranes according to the present disclosure may be triggered by means of adjusting the pH-value of the aqueous media to be filtered. That is, for example, filtering certain elements from the aqueous media may be started or avoided by adjusting the pH-value of the aqueous media. This may be a particular advantage in the biopharmaceutical industry. Zeta-potential and isoelectric point as described herein are preferably determined as described in the experimental section. Also, it is preferred that the amount of IgG bound to the surface of the membrane is lower than 16 $\mu g/cm^2$, preferably lower than 15 $\mu g/cm^2$, and more preferably lower than 14 $\mu g/cm^2$. After extraction of the membranes, it is preferred that the amount of IgG bound to the surface of the membrane is lower than 26 $\mu g/cm^2$, preferably lower than 25 $\mu g/cm^2$, and more preferably lower than 24 $\mu g/cm^2$. This has the advantage that the polymeric membranes as described herein exhibit a very low tendency to adsorb proteins, even after exposure to extraction. The IgG-values as used herein are preferably determined as described in the experimental section of the present disclosure.

The present disclosure further provides a process for producing a surface-modified polymeric membrane, comprising the following steps:

(I) Providing a polymeric membrane;

(II) Applying a solution comprising hydrophilic monomers to the polymeric membrane; and (III) Irradiating the polymeric membrane with actinic radiation, preferably UV light, wherein the hydrophilic monomers comprise (i) at least one amino moiety;

(ii) at least one polyoxyalkylene unit; and (iii) at least one (meth)acrylate moiety.

Therein, the hydrophilic monomers as disclosed herein for the polymeric membranes as described herein are used in the processes according to the present disclosure. This also applies for the polymeric membranes. Preferably, the actinic radiation used for curing the hydrophilic monomers is UV light for the reasons already described herein.

In step (iii), irradiation with actinic radiation having wavelengths greater than 290 nm, preferably of greater than 300 nm is carried out. Irradiating with wavelengths greater than 290 nm, preferably of greater than 300 nm has the effect that not only the surface of the membrane facing the source of irradiation is modified, rather, modification of the surface of the pores extends into the thickness of the membrane and even to the side facing away from the source of irradiation. Using actinic radiation of lower wavelengths may lead to only superficial modification of either first or second surfaces. On the other hand, using wavelengths greater than 550 nm is probably not be able to lead to sufficient grafting. Preferably, the irradiation with actinic radiation is carried out at wavelengths in the range of from 315 to 350 nm. Source of irradiation may be a UV-lamp as commercially available, which may be combined with one or more filter(s) in order to obtain the irradiation at the desired wavelengths. These devices and their combination and application are well known to the skilled person. The dose of actinic irradiation also influences the modification of the membrane surface with acrylate and methacrylate monomers. For example, weight gain is influenced. A higher dose would give rise to higher weight gain, i.e. more (meth)acrylate monomers are polymerized or grafted onto the membrane surface. Preferably, treatment with actinic irradiation is carried out with an irradiation dose of a mean value of at least 1 $J/cm^2$. Lower doses were found to yield low surface modification and low weight gain ratios, which is undesirable for manufacturing on industrial scale. Low surface modification also translates in lower hydrophilicity and higher protein binding and may also yield higher extractables, which is also not desirable. On the other hand, while higher doses furnish more surface modification in terms of higher weight gain by grafted (meth)acrylate, this may also affect water permeability of the modified membrane. In addition, for higher doses, no further increase of hydrophilicity (i.e. decreased protein binding) may be found. Accordingly, it is preferred that the treatment with actinic irradiation is carried out with an irradiation dose of a mean value of not higher than 25 $J/cm^2$. Preferably, treatment with actinic irradiation is carried out with an irradiation dose of a mean value in the range of from 1 to 25 $J/cm^2$, preferably in the range of from 2 to 22 $J/cm^2$, more preferably in the range of from 3 to 20 $J/cm^2$. The doses in the preferred ranges may be achieved by correspondingly actuating the source of irradiation. This may be a commonly known UV irradiation lamp. Alternatively, the membrane and the monomer solution applied thereto may be moved in relation to the source of irradiation at a certain constant speed. For example, the membrane may be placed onto a conveyor belt and then moved under a fixed UV lamp at a certain speed, resulting in a certain residual time of the membrane under the lamp and consequently in the desired dose. In this regard, the side of the membrane as described herein facing the irradiation source in the process according to the present disclosure may be called “first side”, the side of the membrane facing away the irradiation source may be called “second side” of the membrane. While it is preferred for practical reasons that irradiation is affected only onto one side of a membrane (i.e. the “first side”), irradiation may also be affected onto the other side of the membrane (i.e. the “second side”).

The irradiation step (iii) in the method according to the present disclosure may be carried out at ambient conditions. This is advantageous for manufacturing on industrial scale since no additional measures such as cooling, heating or protective atmosphere are necessary, resulting in a resource-efficient process.

Preferably, the method according to the present disclosure comprises an additional step (iv) subjecting the membrane obtained in step (iii) to an extracting step to remove residual solvents and additives. Preferably, this extracting step comprises subjecting the membrane to at least one extraction bath. For practical reason, it is preferred that at least one extraction bath comprises water even consists of water. Preferably, the at least one extraction bath may be at ambient temperature, but may also be tempered to a temperature in the range of 20 to 100° C., preferably in the range of from 25 to 90° C., more preferably in the range of from 30 to 80° C.

Similarly, it is preferred that the method as described herein comprises a further step (v) drying the membrane. Drying has the common meaning in the art, i.e. the removal of solvent, in particular water, from the membrane surfaces and/or the membrane pores. Preferably, drying in step (v) comprises exposing the membrane to air having a temperature in the range of from 25 to 120° C., preferably in the range of from 35 to 105° C., and more preferably in the range of from 45 to 95° C. Means and methods for drying membranes, in particular flat-sheet membranes by exposing the membrane to air having temperatures in the preferred ranges, are known in the art to the skilled person.

Using the hydrophilic monomers as described herein and irradiating the membrane at wavelengths greater than 290 nm, preferably of greater than 300 nm has the effect that the surface of the polymeric membrane gets modified, i.e. the monomers polymerize and/or get grafted onto the polymeric membrane surface. Formation of the modified surface gives rise to a certain weight gain of the membrane. This weight gain may be determined as described in the experimental section.

The solvent in the solution comprising the monomers as described herein preferably comprises water. Preferably, the solvent comprises water and may further comprise at least one further solvent. The at least one further solvent may be selected from the list consisting of alcohols such as methanol, ethanol and propanol (both iso-propanol and neopropanol) as well as butanol, pentanol and hexanol, halogenated solvents such as dichloromethane, ethers such as diethylether, esters such as ethylacetate and ketones such as acetone and butanone (methylethyl ketone). It is preferred that the solvent is water, preferably deionized water since this may yield the best reproducible results. Preferably, the solution contains the monomers in an amount of at least 1 wt.-%. Lower amounts would result in a slow weight gain during irradiation in the subsequent step, which is not desirable from a process economy in an industrial scale. It is also preferred that the solution contains the monomers in an amount of not higher than 20 wt.-%. Higher amounts may not necessarily lead to a higher weight gain, but may also lead to undesired side reactions. An adversary effect of using higher amounts may be, e.g., water permeation of the membrane reduced to low levels undesired or even unsuitable for many applications of the membrane. Moreover, it was found that above this amounts no further benefit with regard to protein binding properties of the modified membrane existed. In this regard, it is preferred that the solution contains the monomers in an amount in the range of from 1 to 20 wt.-%, preferably in the range of from 2 to 18 wt.-%, more preferably in the range of from 4 to 16 wt.-%.

“Applying the solution” comprising the monomers as described herein may be carried out by spraying the solution onto the membrane or immersing the membrane in a vessel containing the solution. Preferably, the vessel is a shallow vessel and is suitable for transmitting the actinic irradiation of corresponding wavelengths as described herein. In this regard, it is preferred that the vessel is shallow so that the membrane is immersed in the solution and covered by the solution containing the monomers. Diptrays and tablets are preferred examples.

Due to the unique combination of properties of the membranes as described herein, preferably obtained from the method as described herein, the present disclosure further provides a use of the membranes as described herein for filtration processes. This may involve microfiltration, nanofiltration or even ultrafiltration. “Microfiltration”, “Nanofiltration” and “ultrafiltration” have the meaning common in the art. Preferably, the use as described herein comprises water purification, filtration in the production of food, filtration in the production of beverages, filtration in the electronics industry, medical filtration and filtration in the biopharmaceutical industry. Preferred uses are hemodialysis, virus filtration, and sterile filtration. Also preferred uses comprise microfiltration sterilizing filters, ultrafiltration clearance filters, but also wine clarification, beer filtration, vinegar clarification, and potable water purification.

The present disclosure may further be exemplified by the following items:

1. A polymeric membrane, comprising a modified surface obtained from coating with hydrophilic monomers and curing the hydrophilic monomers with actinic irradiation, preferably UV light, wherein the hydrophilic monomers comprise (i) at least one amino moiety;

(ii) at least one polyoxyalkylene unit; and (iii) at least one (meth)acrylate moiety.

2. The polymeric membrane according to item 1, wherein the membrane is a flat-sheet membrane or a hollow-fiber membrane.

3. The polymeric membrane according to item 2, wherein the polymeric membrane is a flat-sheet membrane.

4. The polymeric membrane according to item 2, wherein the polymeric membrane is a hollow-fiber membrane.

5. The polymeric membrane according to any one of the preceding items, wherein the polymeric membrane is selected from polymeric sulfone membranes, polyethylene membranes, polypropylene membranes, polyvinylidene difluoride membranes and polyacrylonitrile membranes.

6. The polymeric membrane according to item 5, wherein the polymeric membrane is a polymeric sulfone membrane.

7. The polymeric membrane according to item 6, wherein the polymeric sulfone is selected from polysulfone, polyethersulfone, and polyarylsulfone.

8. The polymeric membrane according to item 7, wherein the polymeric sulfone is polyethersulfone.

9. The polymeric membrane according to any one of the preceding items, wherein the actinic irradiation is UV light.

10. The polymeric membrane according to any one of the preceding items, wherein the at least one polyoxyalkylene unit of the hydrophilic monomer is selected from polyethers.

11. The polymeric membrane according to any one of the preceding items, wherein the at least one amino moiety of the hydrophilic monomer is at least one secondary amino moiety and/or at least one tertiary amino moiety.

12. The polymeric membrane according to any one of the preceding items, wherein the hydrophilic monomer comprises at least one secondary amino moiety.

13. The polymeric membrane according to item 11, wherein the hydrophilic monomer comprises one secondary amino moiety, two secondary amino moieties, three secondary amino moieties, or four secondary amino moieties.

14. The polymeric membrane according to any one of the preceding items, wherein the hydrophilic monomer comprises at least one tertiary amino moiety.

15. The polymeric membrane according to item 14, wherein the monomer comprises one tertiary amino moiety, two amino moieties, three amino moieties, or four tertiary amino moieties.

16. The polymeric membrane according to any one of the preceding items, wherein the hydrophilic monomer comprises (meth)acrylate moieties in an amount of from 1 to 10, preferably from 1 to 8, more preferably from 1 to 6.

17. The polymeric membrane according to any one of the preceding items, wherein the hydrophilic monomer comprises acrylate moieties in an amount of from 1 to 10, preferably from 1 to 8, more preferably from 1 to 6.

18. The polymeric membrane according to any one of the preceding items, wherein the hydrophilic monomer is a hydrophilic monomer according to any one of formulae (I), (II), (III), (IV), (V), (VI), (VII), or (VIII)

Formula (I)

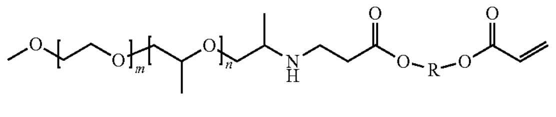

Formula (II)

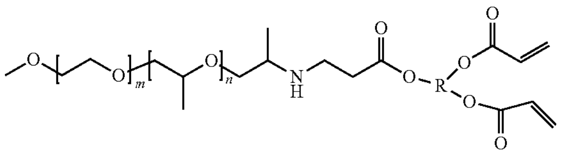

Formula (III)

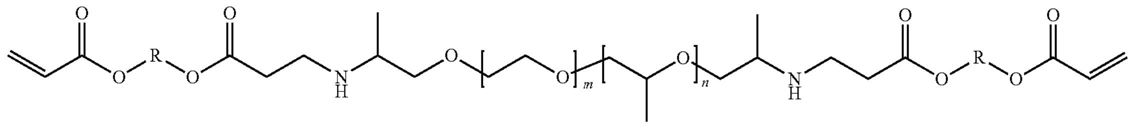

Formula (IV)

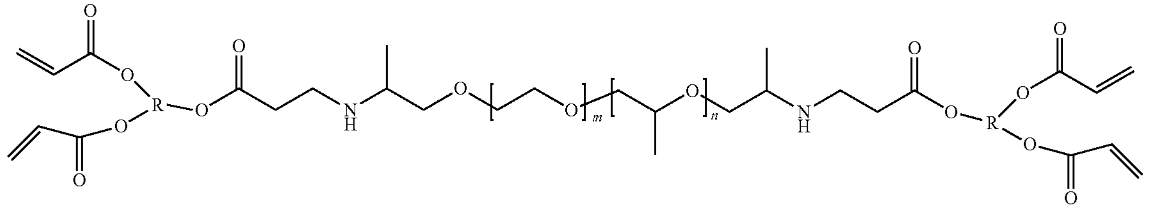

-continued

Formula (V)

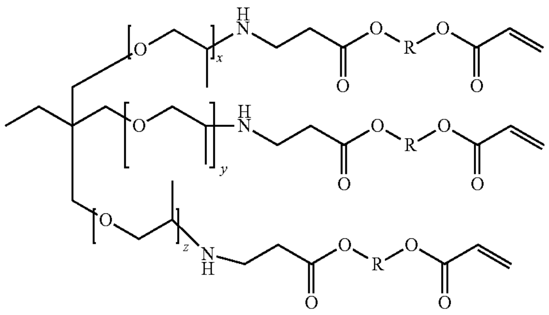

Formula (VI)

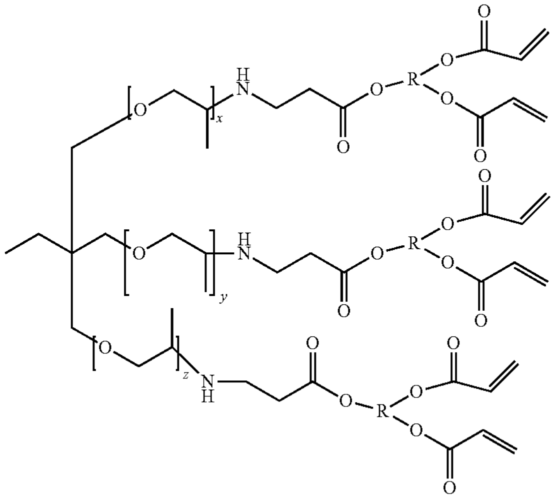

Formula (VII)

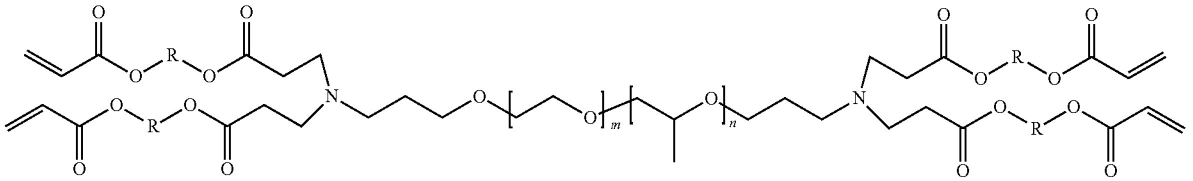

Formula (VIII)

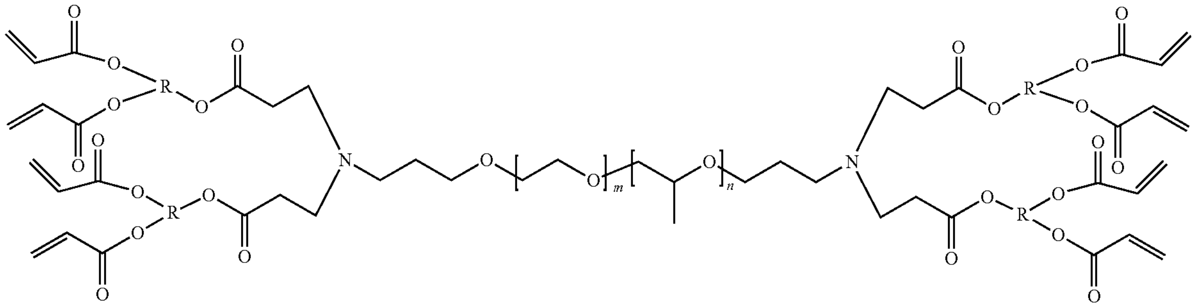

wherein R is a linear or branched alkyl or alkoxy,
wherein m and n may be different or the same,
wherein m and n may each be in a range of from 1 to 100.
wherein x, y, z may be different or the same,
wherein x, y, z may be each in a range of from 1 to 100.

19. The polymeric membrane according to any one of items 1 to 17, wherein the monomer is a monomer according to any one of formulae (IX to XIV)

Formula (IX)

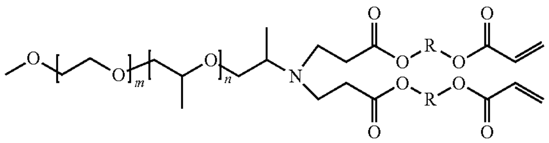

Formula (X)

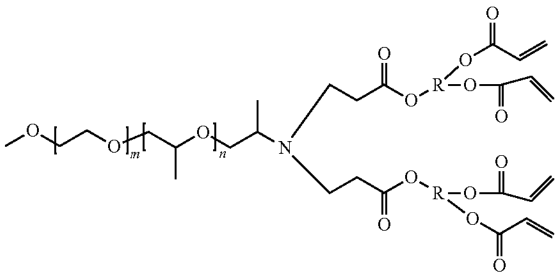

-continued

Formula (XI)

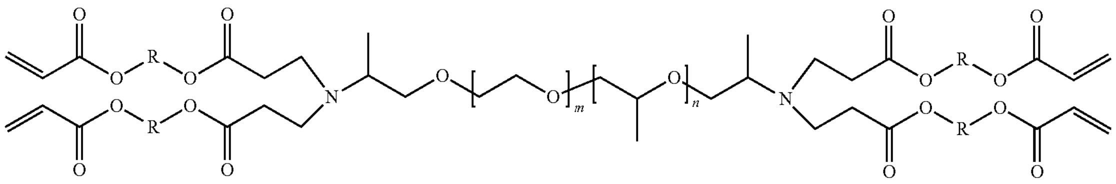

Formula (XII)

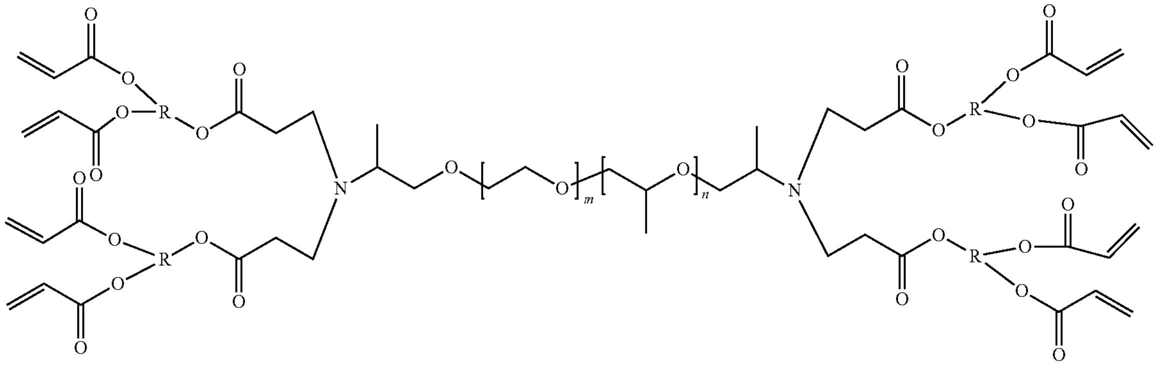

Formula (XIII)

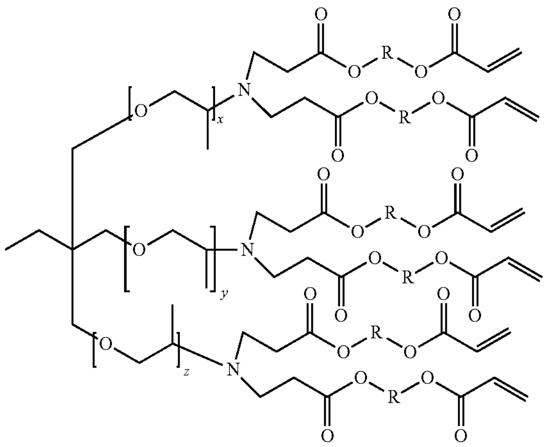

Formula (XIV)

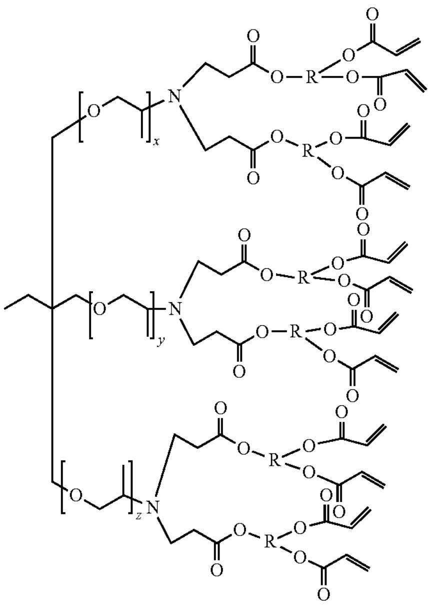

wherein R is a linear or branched alkyl or alkoxy, wherein m and n may be different or the same, wherein m and n may each be in a range of from 1 to 100;

wherein x, y, z may be different or the same, wherein x, y, z may be each in a range of from 1 to 100.

20. The polymeric membrane according to item 18 or item 19, wherein m is in the range of from 1 to 70, more preferably from 1 to 50.

21. The polymeric membrane according to any one of items 18 to 20, wherein n is in the range of from 1 to 70, more preferably from 1 to 50.

22. The polymeric membrane according to any one of items 18 to 21, wherein x is in the range of from 1 to 70, more preferably from 1 to 50.

23. The polymeric membrane according to any one of items 18 to 22, wherein y is in the range of from 1 to 70, more preferably from 1 to 50.

24. The polymeric membrane according to any one of items 18 to 23, wherein z is in the range of from 1 to 70, more preferably from 1 to 50.

25. The polymeric membrane according to any one of the preceding items, wherein the hydrophilic monomer is obtained from reacting at least one polyoxyalkylamine with at least one (meth)acrylate compound.

26. The polymeric membrane according to item 25, wherein the polyoxyalkylamine is a polyetheramine comprising ethyleneoxide-units and propyleneoxide-units.

27. The polymeric membrane according to item 26, wherein in the polyetheramine, the ratio of ethyleneoxide-units to propyleneoxide-units EO:PO is in the range of from 1 to 20, preferably from 1 to 15, more preferably from 1 to 10.

28. The polymeric membrane according to any one of items 25 to 27, wherein the hydrophilic monomer was obtained by reacting a polyoxyalkylamine, preferably a polyetheramine, with at least one acrylate compound.

29. The polymeric membrane according to item 28, wherein the at least one acrylate compound is selected from alkyldiacrylates, alkyltriacrylates, alkyltetraacrylates, alkylpentaacrylates, alkylhexaacrylates, polyethylene glycol diacrylates, ethoxylated trimethylolpropane triacrylates, and trimethylolpropane triacrylate.

30. The polymeric membrane according to item 29, wherein the at least one acrylate compound is selected from polyethylene glycol diacrylates, preferably having between 2 and 20 ethoxy units.

31. The polymeric membrane according to item 29, wherein the ethoxylated trimethylolpropane triacrylates comprise ethoxy units in an amount of from 4 to 25, preferably between 5 to 23, more preferably between 6 and 20.

32. The polymeric membrane according to any one of items 25 to 31, wherein the polyoxyalkylamine exhibits a molecular weight of 8000 Dalton and less, preferably of 7000 Dalton and less, more preferably of 6000 Dalton and less.

33. The polymeric membrane according to any one of items 25 to 32, the polyoxyalkylamine exhibits a molecular weight of at least 80 Dalton, preferably at least 100 Dalton, more preferably at least 200 Dalton.

34. The polymeric membrane according to any one of items 25 to 33, the polyoxyalkylamine exhibits a molecular weight in the range of from 80 Dalton to 8000 Dalton, preferably from 100 Dalton to 7000 Dalton, and more preferably from 200 Dalton to 6000 Dalton.

35. The polymeric membrane according to any one of the preceding items, wherein the surface of the polymeric membrane exhibits a positive zeta-potential at pH-values of less than 5, preferably less than 6, and preferably less than 7.

36. The polymeric membrane according to any one of the preceding items, wherein surface of the polymeric membrane exhibits an isoelectric point at a pH-value in the range of from 4 to 9, preferably from 4.5 to 8.5, more preferably from 5 to 8.

37. A process for producing a surface-modified polymeric membrane, comprising the following steps:

(I) Providing a polymeric membrane;

(II) Applying a solution comprising hydrophilic monomers to the polymeric membrane; and (III) Irradiating the polymeric membrane with actinic radiation, preferably UV light, wherein the hydrophilic monomers comprise (i) at least one amino moiety;

(ii) at least one polyoxyalkylene unit; and (iii) at least one (meth)acrylate moiety.

38. The process according to item 37, wherein the actinic radiation in step (III) is UV light.

39. The process according to item 37 or item 38, wherein irradiating with actinic radiation is carried out an irradiation dose of a mean value in the range of from 1 to 25 J/cm$^2$, preferably in the range of from 2 to 22 J/cm$^2$, more preferably in the range of from 3 to 20 J/cm$^2$.

40. The process according to any one of items 37 to 39, wherein irradiating with actinic irradiation is carried out at wavelengths greater than 300 nm, preferably at least 315 nm.

41. The process according to any one of items 37 to 40, wherein irradiating with actinic irradiation is carried out at wavelengths in the range from 315 to 350 nm.

42. The process according to any one of items 37 to 41, wherein the polymeric membrane is selected from polymeric sulfone membranes, polyethylene membranes, polypropylene membranes, polyvinylidene difluoride membranes and polyacrylonitrile membranes.

43. The process according to any one of items 37 to 42, wherein the polymer of the polymeric membrane is selected from polymeric sulfone.

44. The process according to item 43, wherein the wherein the polymeric sulfone is selected from polysulfone, polyethersulfone, and polyarylsulfone.

45. The process according to any one of items 37 to 44, wherein the polymeric membrane is selected from hollow-fiber membranes and flat-sheet membranes.

46. The process according to item 44, wherein the polymeric membrane is a hollow-fiber membrane.

47. The process according to item 44, wherein the polymeric membrane is a flat-sheet membrane.

48. The process according to any one of items 37 to 47, wherein the at least one polyoxyalkylene unit of the hydrophilic monomers is selected from polyethers.

49. The process according to item 48, wherein the polyoxyalkylene unit is a polyether-unit comprising ethyleneoxide-units and propyleneoxide-units.

50. The process according to item 49, wherein in the polyether-unit, the ratio of ethyleneoxide-units to propyleneoxide-units EO:PO is in the range of from 1 to 20, preferably from 1 to 15, more preferably from 1 to 10.

51. The process according to item 50, wherein the polyether-unit exhibits a molecular weight of at least 80 Dalton, preferably at least 100 Dalton, more preferably at least 200 Dalton.

52. The process according to item 50 or item 51, wherein the polyether-unit exhibits a molecular weight of 8000 Dalton and less, preferably of 7000 Dalton and less, more preferably of 6000 Dalton and less.

53. The process according to any one of items 50 to 52, wherein the polyether-unit exhibits a molecular weight in the range of from 800 Dalton to 8000 Dalton, preferably from 100 Dalton to 7000 Dalton, and more preferably from 200 Dalton to 6000 Dalton.

54. The process according to any one of items 37 to 53, wherein the at least one amino moiety of the hydrophilic monomer is at least one secondary amino moiety and/or at least one tertiary amino moiety.

55. The process according to item 54, wherein the hydrophilic monomer comprises at least one secondary amino moiety.

56. The process according to item 55, wherein the hydrophilic monomer comprises one secondary amino moiety, two secondary amino moieties, three secondary amino moieties, or four secondary amino moieties.

57. The process according to item 55, wherein the hydrophilic monomer comprises at least one tertiary amino moiety.

58. The process according to item 56, wherein the hydrophilic monomer comprises one tertiary amino moiety, two amino moieties, three amino moieties, or four tertiary amino moieties.

59. The process according to any one of items 37 to 58, wherein the hydrophilic monomer comprises (meth)acrylate moieties in an amount of from 1 to 10, preferably from 1 to 8, more preferably from 1 to 6.

60. The process according to any one of items 37 to 59, wherein the hydrophilic polyoxyalkylamine (meth)acrylate monomer comprises acrylate moieties in an amount of from 1 to 10, preferably from 1 to 8, more preferably from 1 to 6.

61. The process according to any one of items 37 to 60, wherein the monomer is a monomer according to any one of formulae (I), (II), (III), (IV), (V), (VI), (VII), or (VIII)
Formula (I)
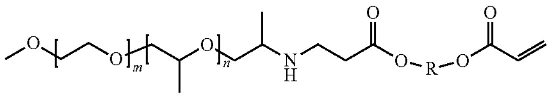
Formula (II)
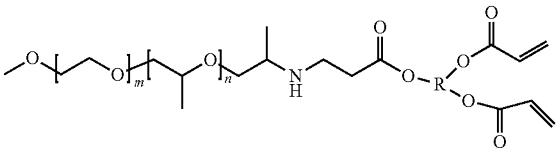
Formula (III)
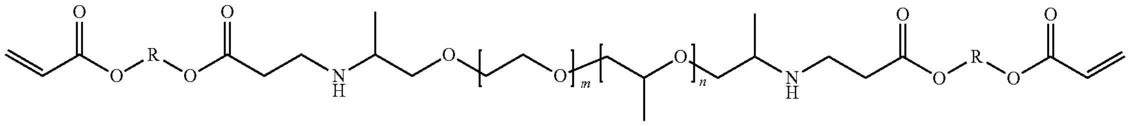
Formula (IV)
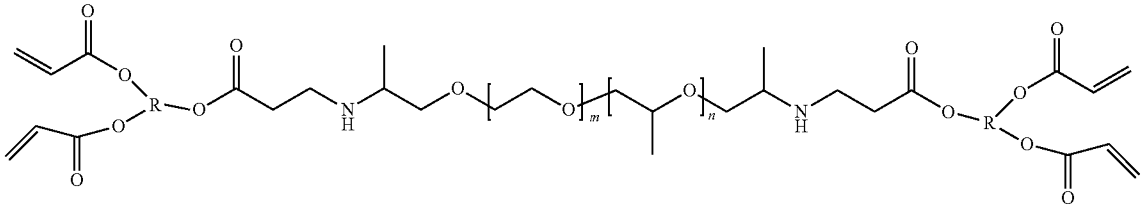
Formula (V)
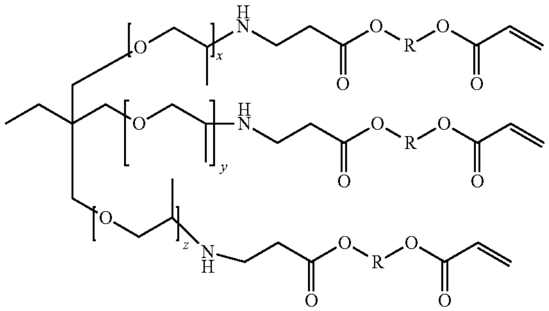
Formula (VI)
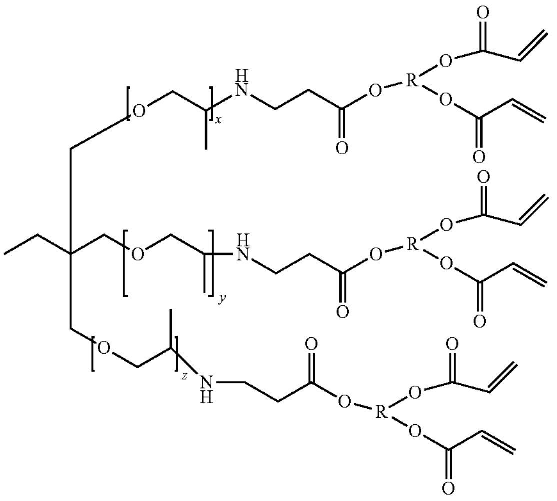
Formula (VII)
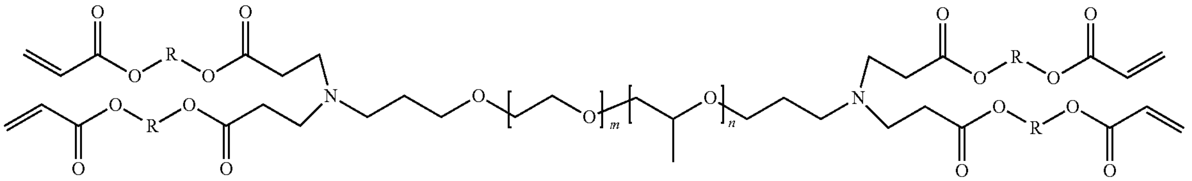

-continued

Formula (VIII)

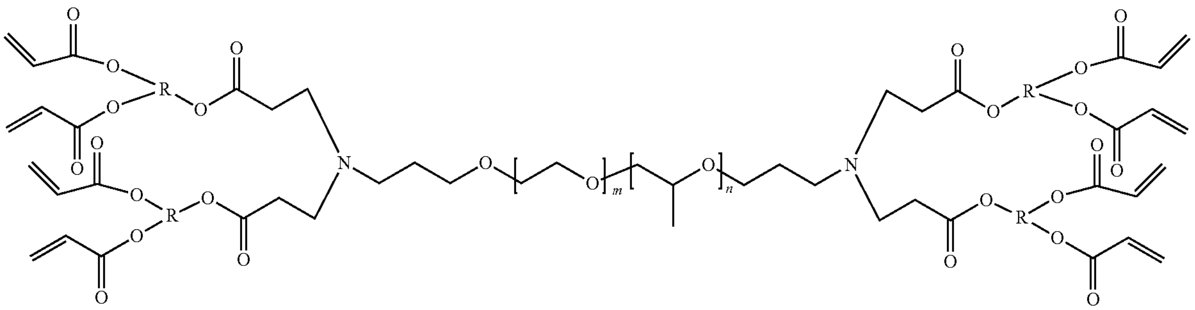

wherein R is a linear or branched alkyl or alkoxy,
wherein m and n may be different or the same,
wherein m and n may each be in a range of from 1 to 100,
wherein x, y and z may be different or the same,
wherein x, y and z may each be in a range of from 1 to 100.

62. The process according to any one of items 37 to 60, wherein the monomer is a monomer according to any one of formulae (IX to XIV)

Formula (IX)

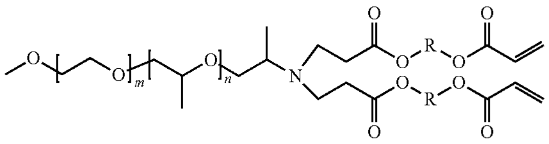

Formula (X)

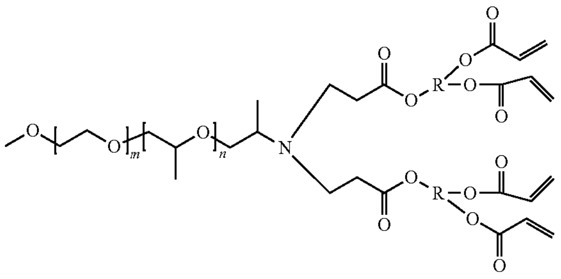

Formula (XI)

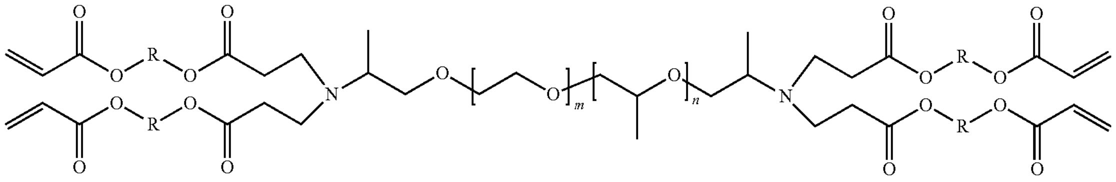

Formula (XII)

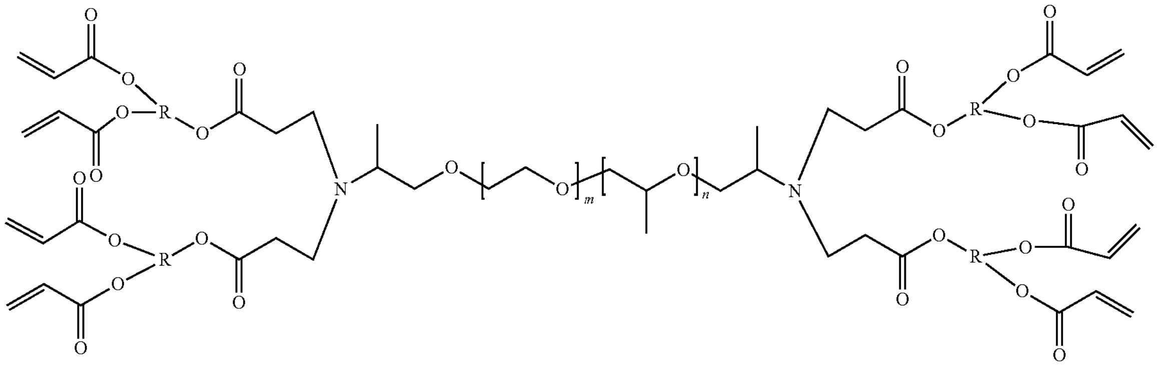

-continued

Formula (XIII)

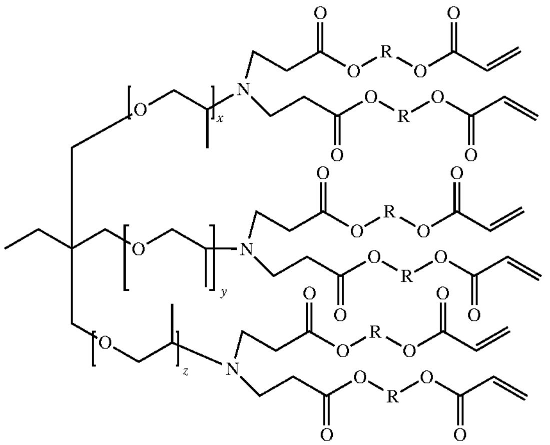

Formula (XIV)

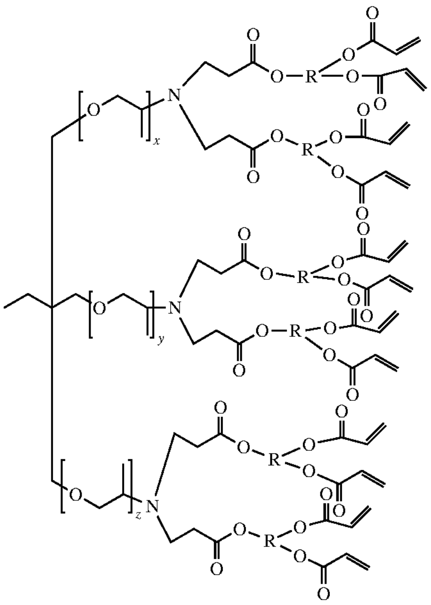

wherein R is a linear or branched alkyl or alkoxy,
wherein m and n may be different or the same,
wherein m and n may each be in a range of from 1 to 100;
wherein x, y, z may be different or the same,
wherein x, y, z may be each in a range of from 1 to 100.

63. The process according to item 61 or item 62, wherein m is in the range of from 1 to 70, more preferably from 1 to 50.

64. The process according to any one of items 61 to 63, wherein n is in the range of from 1 to 70, more preferably from 1 to 50.

65. The process according to any one of items 61 to 64, wherein x is in the range of from 1 to 70, more preferably from 1 to 50.

66. The process according to any one of items 61 to 65, wherein y is in the range of from 1 to 70, more preferably from 1 to 50.

67. The process according to any one of items 61 to 66, wherein z is in the range of from 1 to 70, more preferably from 1 to 50.

68. Use of the polymeric membrane according to any one of items 1 to 36 for microfiltration or ultrafiltration.

69. Use according to item 68, wherein the use comprises microfiltration or ultrafiltration of aqueous media.

70. Use according to item 68 or item 69, wherein the use comprises water purification, filtration in the production of food, filtration in the production of beverages, filtration in the electronics industry, medical filtration and filtration in the biopharmaceutical industry.

71. Use according to item 70, wherein the use is selected from microfiltration sterilizing filters and ultrafiltration viral clearance filters.

72. The use according to item 70, wherein the use is selected from wine clarification, vinegar clarification, and potable water purification.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated. The exemplary hydrophilic monomers according to the present disclosure are indicated as "PEA" and a number. These are examples according to the present disclosure. Finally, coating experiments are described. They are indicated below as "Ex." and a number: these are also examples according to the present disclosure.

Test Methods

Determination of the Transmembrane Flow (Water Permeability)

Disc-shaped membrane samples are stamped out of the membrane to be tested and then clamped fluid-tight at the perimeter in a suitable sample holder such that a free measuring area of 43.2 $cm^2$ results. The sample holder is located in a housing that can be penetrated under pressure by water. The clamped membrane sample is then penetrated, from the side on which the surface of the membrane with the smaller pores is located, by deionized water conditioned to 25° C. at a defined pressure between 0.1 and 0.2 bar. The water volume that flows through the membrane sample during a measuring period of 60 s is determined gravimetrically or volumetrically.

The transmembrane flow, TMF, is determined according to formula (III)

$$TMF\left[\frac{l}{m^2 \cdot h \cdot bar}\right] = \frac{Vw}{\Delta t \cdot A_M \cdot \Delta p} \cdot 600 \qquad \text{(III)}$$

where:

Vw=volume of water [ml] flowing through the membrane sample during the measuring period Δt=measuring time [min]

$A_M$=area of the membrane sample penetrated (43.2 $cm^2$)

Δp=pressure set during the measurement [bar]

Weight Gain

The weight gain of each sample after performing UV-grafting is calculated according to the following formula:

Weight gain=(Weight after grafting−Weight before grafting)/Weight before grafting)×100

The weight gain value represents the amount of grafted polymer on the membrane surface.

Water Permeability Test and Determination of the Water Permeability Reduction

The water permeability was measured with a custom-made setup using deionized water. The membrane samples were cut in 43.2 $cm^2$ circles and the roll side (shiny side) was used as upstream side. Measurements were performed at a transmembrane pressure of 0.6 bar at a temperature of 25° C. The permeate volume was recorded as a function of time for each sample.

The water permeability reduction is defined as:

Water permeability reduction=((TMF before UV grafting−TMF after UV grafting)/(TMF before UV grafting))×100

Protein Binding Test

Protein adsorption tests were conducted in phosphate buffered saline (PBS, SigmaAldrich Co. LLC) using the model protein Immunoglobulin G (IgG) (from human blood, 99%, SigmaAldrich Co. LLC) at pH 7.4. The membrane samples (circles, 1 cm in diameter) were placed on a microwell plate and immersed in the Immunoglobulin G (IgG) solution (4 g/L) for one hour on a shaker. Afterwards the protein solution was removed and the samples were washed with PBS buffer three times. Afterwards the amount of surface-bound IgG was determined with the help of the Pierce BCA protein assay kit (Thermo Fisher Scientific Inc., Waltham/USA). The BCA assay contains of bichincinonic acid and copper(II)sulfate, the reaction of the surface-bound protein with the copper(II)-complex leads to the formation of a distinct copper(I)-complex which can be photometrically detected at 562 nm.

Extraction

A harsh extraction test in deionized water/ethanol (70/30) for 4 hours at 60° C. was used to test the durability of the surface modification. The samples were immersed in that solution and dried in the oven at 60° C. overnight afterwards.

Zeta-potential Analysis

The Zeta-potential of a membrane surface is a measure of its surface charge at the solid/fluid interface and was measured with the SurPass electrokinetic analyzer from Anton Paar (Graz, Austria). After cutting the membrane samples into two 20×10 mm pieces they were attached to both sample holders of the Adjustable Gap Cell with a double-sided adhesive tape. The gap height between the two samples holders was adjusted to 0.1 μm to form a streaming channel. After filling the system with $10^{-3}$ mol/L potassium chloride solution a pH titration was performed with 0.05 mol/L sodium hydroxide solution starting at pH 3. Then the pH was stepwise increased to 8. The Zeta-potential at each pH step was calculated according to Helmholtz-Smoluchowski equation:

$$\zeta=(DI/DP)\times(\eta/\varepsilon_0\varepsilon)\times(L/Q)$$

with: ζ=Zeta-potential, DI/DP=slope of the streaming current against the pressure across the streaming channel, $\varepsilon_0$=vacuum permittivity, ε=dielectric constant of the electrolyte solution, L=length of the streaming channel and Q=cross-section of the streaming channel.

Reagents

TABLE 1

Reagents used in the examples.

| | |
|---|---|
| BDDA | 1,4 butanediol diacrylate, available from BASF as Laromer BDDA |
| Irgacure 500 | photoinitiator, available from BASF |
| Jeffamine ® M1000 | monofunctional polyetheramine with MW1000 and PO/EO ratio 3/19, available from Huntsman |
| Jeffamine ® M2070 | monofunctional polyetheramine with MW2000 and PO/EO ratio 10/32, available from Huntsman |
| Jeffamine ® ED900 | difunctional polyetheramine with MW900 and PO/EO ratio 3.6/15.5, available from Huntsman |
| Jeffamine ® T403 | triifunctional polyetheramine with MW440 (only PO), available from Huntsman |
| Jeffamine ® D400 | difunctional polyetheramine with MW400 and only PO groups, available from Huntsman |
| Jeffamine ® D2000 | difunctional polyetheramine with MW2000 and only PO groups, available from Huntsman |
| Jeffamine ® ED600 | difunctional polyetheramine with MW600 and PO/EO ratio 3.6/9.0, available from Huntsman |
| MEHQ | hydroquinone monomethyl ether, available from Sigma-Aldrich |
| PTZ | phenothiazine, available from Sigma-Aldrich |
| SR259 | PEG200 diacrylate (4 EO units), available from Sartomer-Arkema |
| SR344 | PEG400 diacrylate (9 EO units), available from Sartomer-Arkema |
| SR355 | DiTMPTTA: ditrimethylolpropane tetraacrylate, available from Sartomer-Arkema |
| SR610 | PEG600 diacrylate (13 EO units), available from Sartomer-Arkema |
| SR502 | TMPEOTA with 9 EO units, available from Sartomer-Arkema |
| SR9035 | TMPEOTA with 15 EO units, available from Sartomer-Arkema |
| TMPEOTA | ethoxylated trimethylolpropane triacrylate |
| TMPTA | trimethylolpropane triacrylate, available from ECEM |
| 1,13 TTD | 4,7,10-trioxatridecane-1,13-diamine; 3,3'-oxybis(ethyleneoxy)bis(propylamine), available from BASF |
| BSA | benzene sulfonic acid, available from Sigam-Aldrich |
| $Ca(NO_3)_2$ | calcium nitrate, available from Sigma-Aldrich |
| DBU | diazabicyclo-undecene, available from Sigma-Aldrich |
| PTSA•$H_2O$ | p.toluenesulfonic acid monohydrate |
| TMG | tetramethylguanidine, available from Sigma-Aldrich |

Preparation of Polyoxyalkylamine Acrylate Monomers

Exemplary Reaction Procedure 1: Polyetheramine/Acrylate Mole Ratio 1:2

A 100 ml polymerization bottle was charged respectively with TM PTA (7.40 g; 25 mmole), MEHQ (10 mg), PTZ (3 mg) and Jeffamine® M2070 (25.00 g; 12.5 mmole). The polymerization bottle was run for 16 hours in a preheated Launder-O-meter at 80° C., resulting in a viscous liquid. According to NMR spectroscopy, the reaction product contained 97% mono-adduct, 3% di-adduct and no residual Jeffamine® M2070.

Other polyetheramine acrylates were prepared using the same procedure, resulting in mainly the mono-adducts, small amounts of di-adduct and no residual Jeffamine®.

The experiments are summarized in table 2.

TABLE 2

Polyetheramine-acrylate experiments according to the present disclosure. Amounts in mole ratios.

| | Jeffamine ® | | | | Acrylate monomers | | | | | | | Polyether amine |
|---|---|---|---|---|---|---|---|---|---|---|---|---|
| | M 1000 | M 2070 | ED 900 | T 403 | TMPTA | BDDA | SR 502 | SR 9035 | SR 259 | SR 344 | SR 610 | acrylate type |
| PEA1 | 1 | | | | 2 | | | | | | | II |
| PEA2 | | 1 | | | 2 | | | | | | | II |
| PEA3 | 1 | | | | 1.1 | | | | | | | II |
| PEA4 | | 1 | | | 1.1 | | | | | | | II |
| PEA5 | 1 | | | | | 2 | | | | | | I |
| PEA6 | 1 | | | | | | 2 | | | | | II |
| PEA7 | 1 | | | | | | | 2 | | | | II |
| PEA8 | | 1 | | | | 2 | | | | | | I |
| PEA9 | | 1 | | | | | 2 | | | | | II |
| PEA10 | | 1 | | | | | | 2 | | | | II |
| PEA11 | | | 1 | | | 4 | | | | | | III |

UV-Grafting Procedure

All experiments were performed with MicroPES 2F microfiltration flat-sheet membranes (obtained from 3M). UV-irradiation trials were conducted with a Lighthammer LH-6 system from Heraeus GmbH, Hanau/Germany. Two "D"-Bulbs having an UV emission spectrum of between 250 and 380 nm were used. PET filters were employed such that only wavelengths greater than 315 nm could reach the membrane surface. The two "D"-Bulbs were placed behind each other to achieve UV-A doses up to 11 J/cm$^2$. The membrane samples were cut into 18×25.4 cm pieces and stored in a Polyethylene (PE)-bag. The general procedure for sample surface modification is described as follows. A monomer solution was prepared by dissolving the required amount of pure monomer in deionized water. Afterwards the membrane sample was taken out of the PE-bag and immersed in the aqueous monomer solution and placed on a glass plate afterwards. A 50 μm thick PET (Polyethylene terephthalate) film (Hostaphan GN 50 4600 A from Mitsubishi) was used to cover the sample and the excess solution was squeezed out with the help of a rubber roller. For every experiment the roll side (shiny side) of the membrane was facing the PET film and the air side (matte side) of the membrane was facing the glass plate. Then the sample sandwich was transferred to the conveyor belt of the Lighthammer system and the sample passed the two UV-"D"-Bulbs. After UV irradiation, the samples were washed three times with deionized water for 15 min each and then dried in an oven (30 min at 100° C.). Afterwards the samples were ready for further characterization and were stored in PE-bags again.

The monomers used in the examples according to the present disclosure as well as the UV-doses used are summarized in table 5. Also summarized in table 5 are the results of the experiments, i.e. the weight gain, the amount of bound IgG before and after the extraction protocol, as well as the trans membrane flow (TMF) before and after the extraction protocol. As comparative example, a non-modified MicroPES 2F-membrane was used.

TABLE 5

Surface modification experiments and comparative example.

| | Monomer | Monomer Conc. [wt-%] | UV-A Dose [J/cm$^2$] | Weight gain [%] | Amount of bound IgG [μg/cm$^2$] | Amount of bound IgG after extraction [μg/cm$^2$] | TMF before extraction [mL/min cm$^2$ bar] | TMF after extraction [mL/min cm$^2$ bar] |
|---|---|---|---|---|---|---|---|---|
| Comp. Ex. 1 | | 0 | 0 | x | 17.34 | 27.59 | 43.6 | 46.1 |
| Ex. 1 | PEAA 4 | 6 | 7 | 4.9 | 0.87 | 12.82 | 38.7 | 39.0 |
| Ex. 2 | PEAA 4 | 6 | 11 | 5.7 | 0.52 | 7.46 | 34.5 | 36.2 |
| Ex. 3 | PEAA 5 | 6 | 11 | 7.1 | 1.34 | 3.15 | 40.9 | 40.1 |
| Ex. 4 | PEAA 6 | 6 | 11 | 10.2 | 6.23 | 19.66 | 32.7 | 33.0 |
| Ex. 5 | PEAA 7 | 6 | 11 | 8.7 | 2.68 | 18.86 | 34.1 | 37.0 |
| Ex. 6 | PEAA 8 | 6 | 11 | 6.2 | 1.31 | 22.02 | 41.2 | 42.6 |
| Ex. 7 | PEAA 9 | 6 | 11 | 8.9 | 0.57 | 18.02 | 36.8 | 38.7 |
| Ex. 8 | PEAA 10 | 6 | 11 | 7.3 | 12.47 | 9.32 | 32.2 | 31.1 |

The invention claimed is:

1. A polymeric membrane, comprising a modified surface obtained from coating with hydrophilic monomers and curing the hydrophilic monomers with actinic irradiation, wherein the hydrophilic monomers comprise (i) at least one amino moiety;

(ii) at least one polyoxyalkylene unit; and (iii) at least one (meth)acrylate moiety;

wherein the hydrophilic monomer is a hydrophilic monomer according to any one of formulae (I), (II), (III), (IV), (V), (VI), (VII), (VIII), (IX), (X), (XI), (XII), (XIII), or (XIV):

Formula (I)
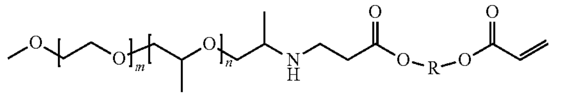
Formula (II)
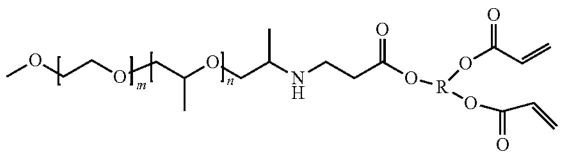
Formula (III)
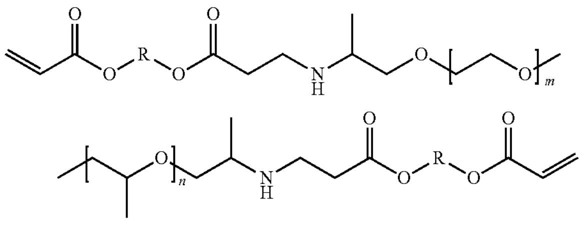
Formula (IV)
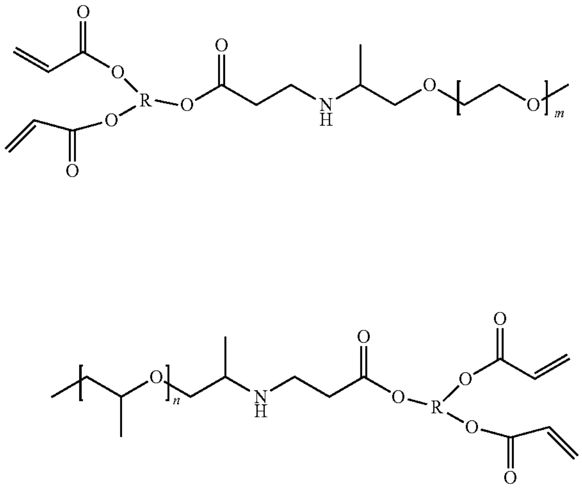
Formula (V)
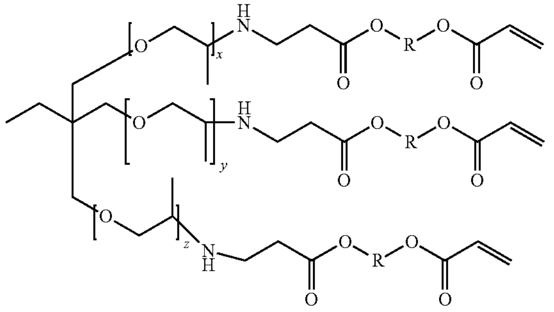
-continued
Formula (VI)
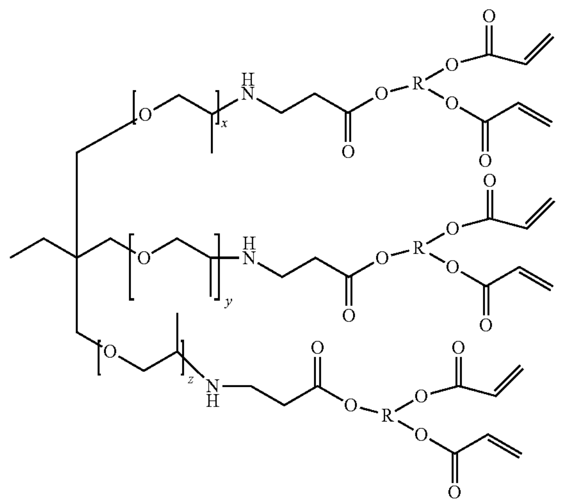
Formula (VII)
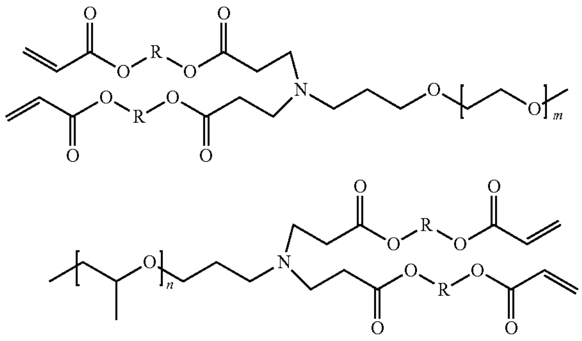
Formula (VIII)
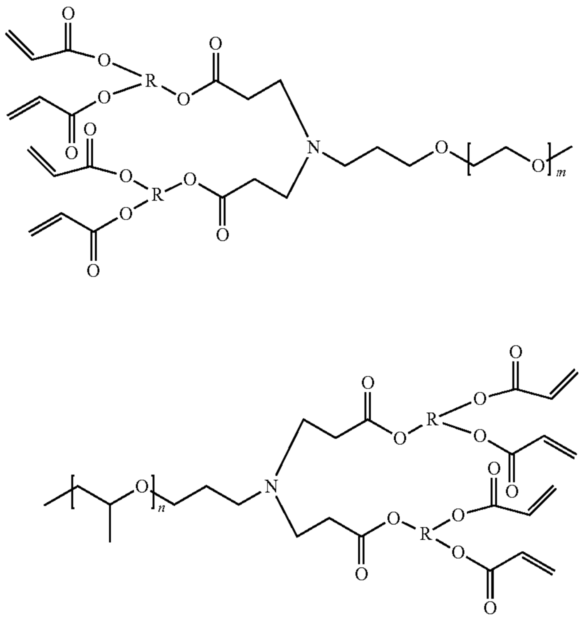

Formula (IX)

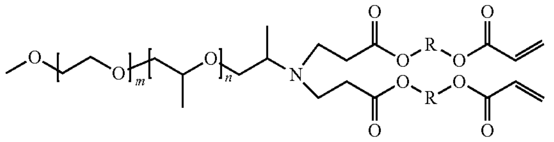

Formula (X)

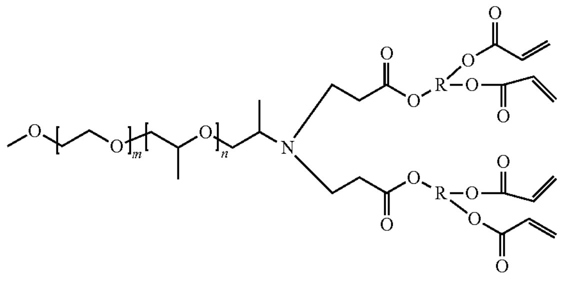

Formula (XI)

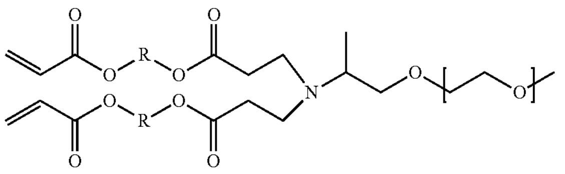

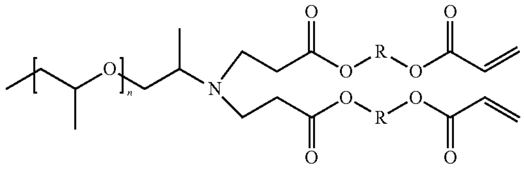

Formula (XII)

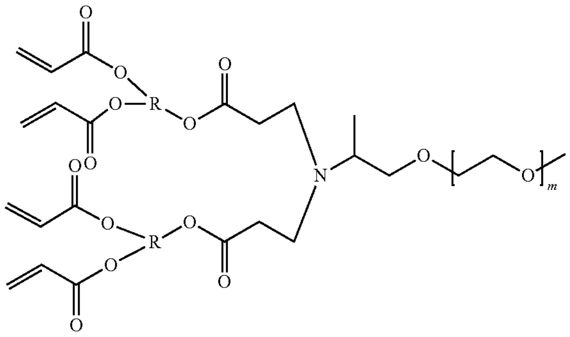

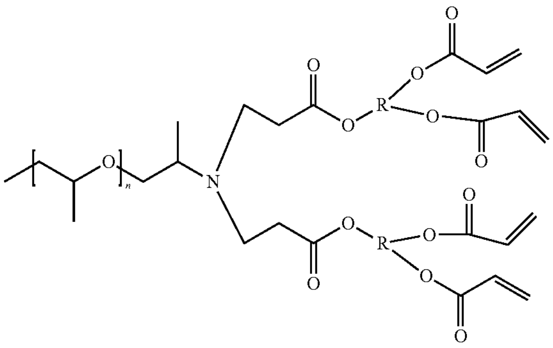

-continued

Formula (XIII)

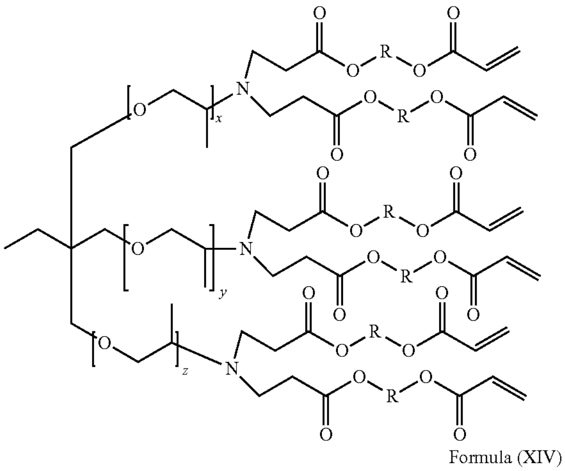

Formula (XIV)

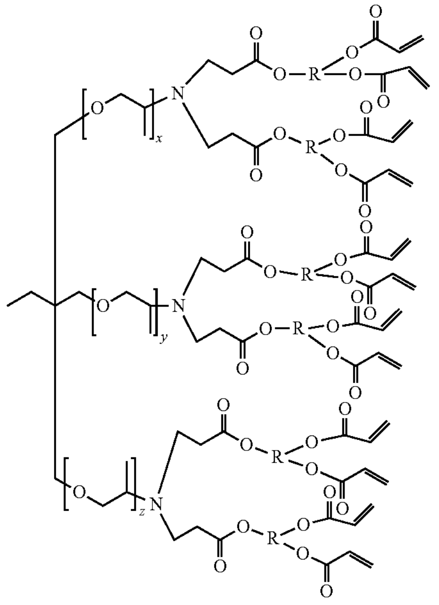

wherein R is a linear or branched alkyl or alkoxy, wherein m and n may be different or the same, wherein m and n may each be in a range of from 1 to 100;

wherein x, y, z may be different or the same, wherein x, y, z may be each in a range of from 1 to 100.

2. The polymeric membrane according to claim 1, wherein the polymeric membrane is selected from polymeric sulfone membranes, polyethylene membranes, polypropylene membranes, polyvinylidene difluoride membranes and polyacrylonitrile membranes.

3. The polymeric membrane according to claim 2, wherein the polymeric membrane is a polymeric sulfone membrane selected from polysulfone, polyethersulfone, and polyarylsulfone.

4. The polymeric membrane according to claim 1, wherein the at least one polyoxyalkylene unit of the hydrophilic monomers is selected from polyethers.

5. The polymeric membrane according to claim 1, wherein the hydrophilic monomers comprise acrylate moieties in an amount of from 1 to 10.

6. The polymeric membrane according to claim 1, wherein the hydrophilic monomers are obtained from reacting at least one polyoxyalkylamine with at least one (meth) acrylate compound.

7. The polymeric membrane according to claim 1, wherein that the amount of surface-bound IgG to the membrane is lower than 16 µg/$cm^2$.

8. A process for producing a surface-modified polymeric membrane, comprising the following steps:

(I) Providing a polymeric membrane;

(II) Applying a solution comprising hydrophilic monomers to the polymeric membrane; and (III) Irradiating the polymeric membrane with actinic radiation, wherein the hydrophilic monomers comprise (i) at least one amino moiety;

at least one polyoxyalkylene unit; and at least one (meth)acrylate moiety;

wherein the hydrophilic monomer is a hydrophilic monomer according to any one of formulae (I), (II), (III), (IV), (V), (VI), (VII), (VIII), (IX), (X), (XI), (XII), (XIII), or (XIV):

Formula (I)

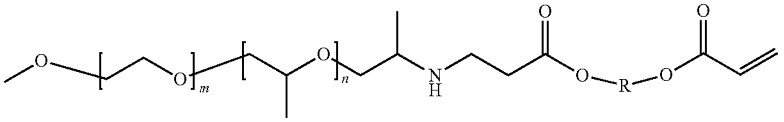

Formula (II)

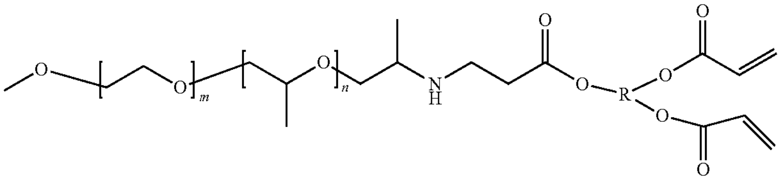

Formula (III)

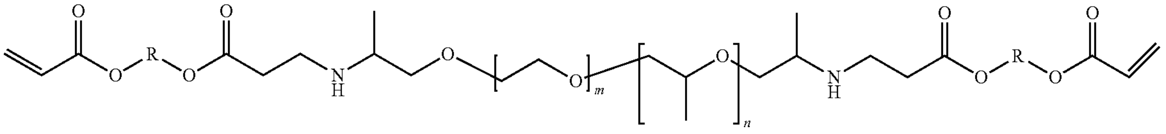

Formulla (IV)

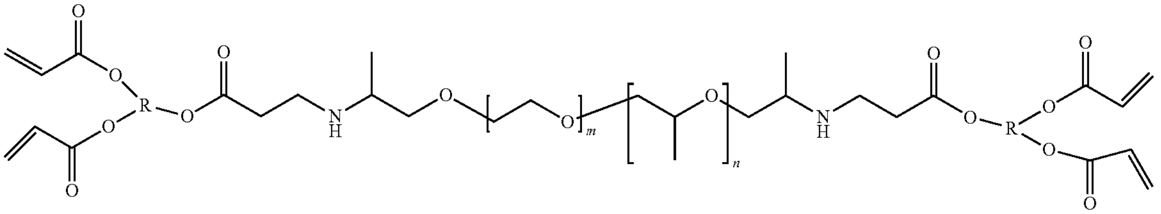

Formula (V)

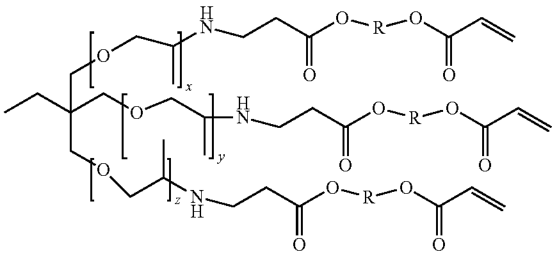

Formula (VI)

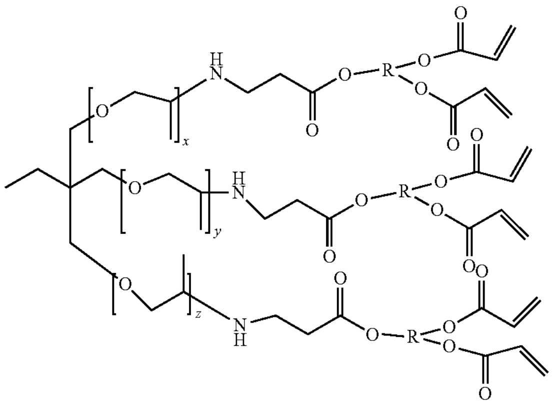

Formula (VII)

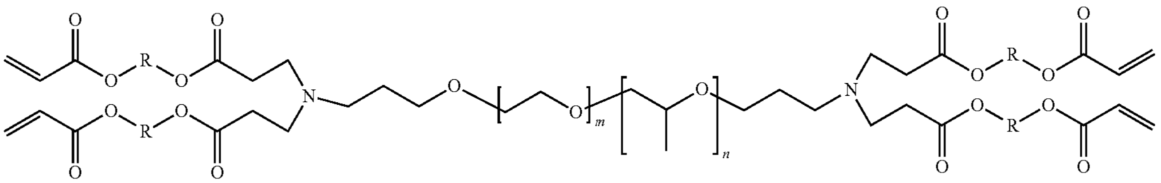

-continued
Formula (VIII)
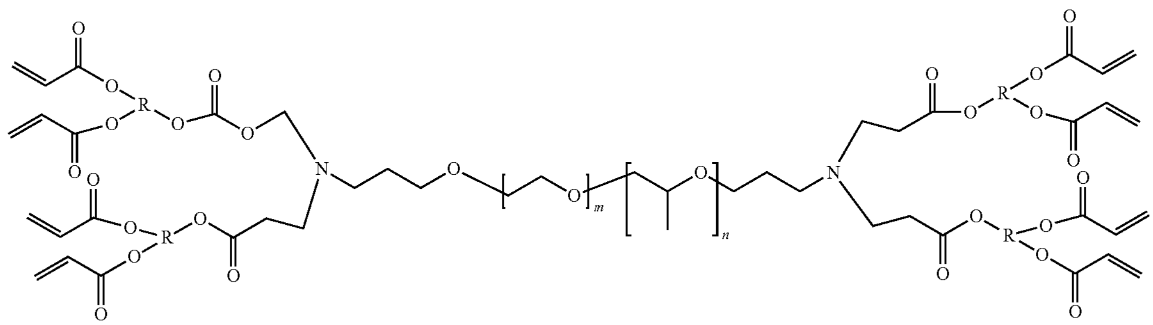
Formula (IX)
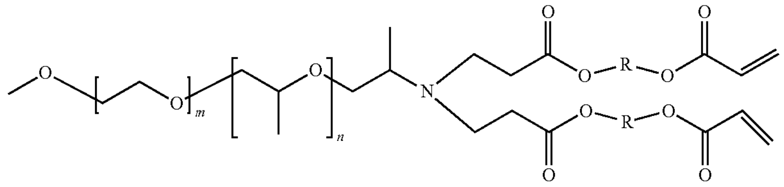
Formula (X)
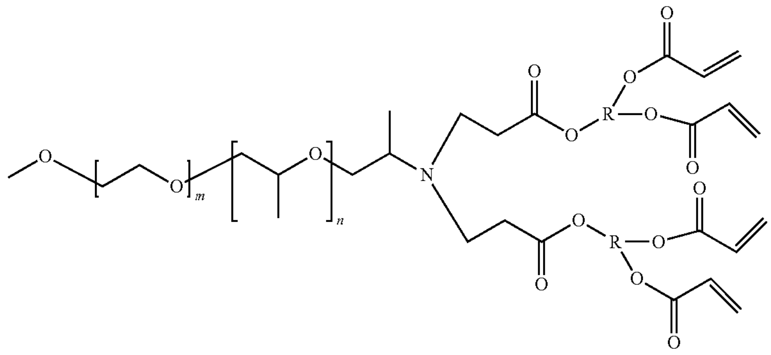
Formula (XI)
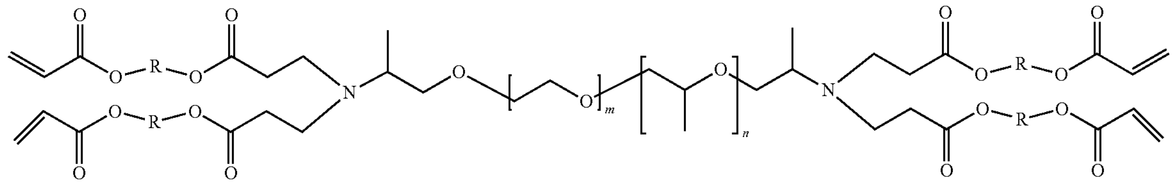
Formula (XII)
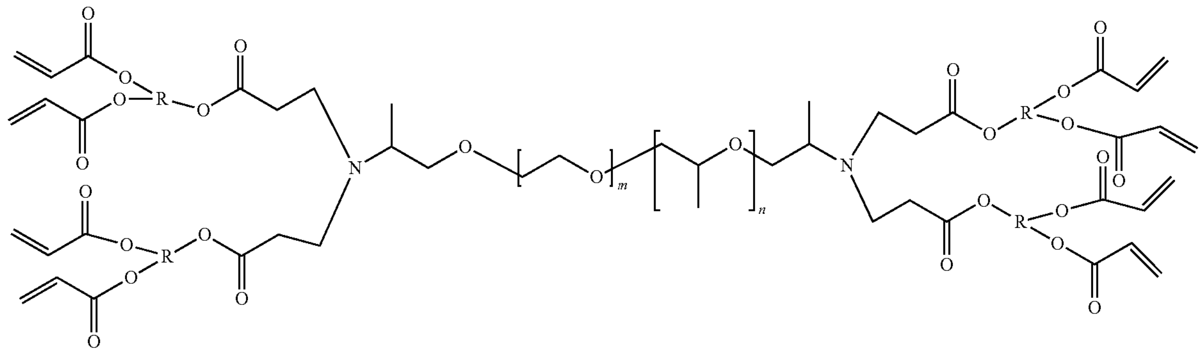

-continued

Formula (XIII)

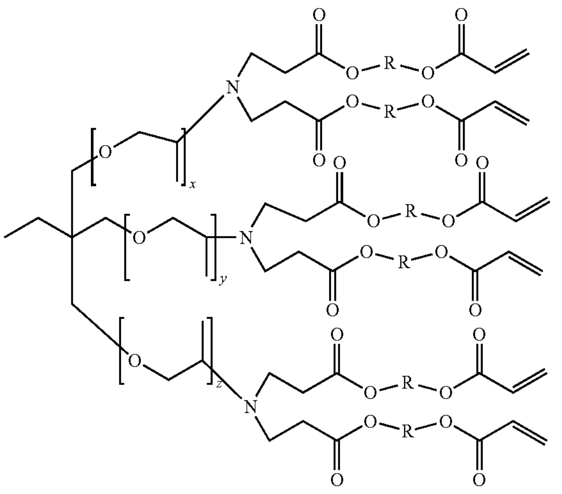

Formula (XIV)

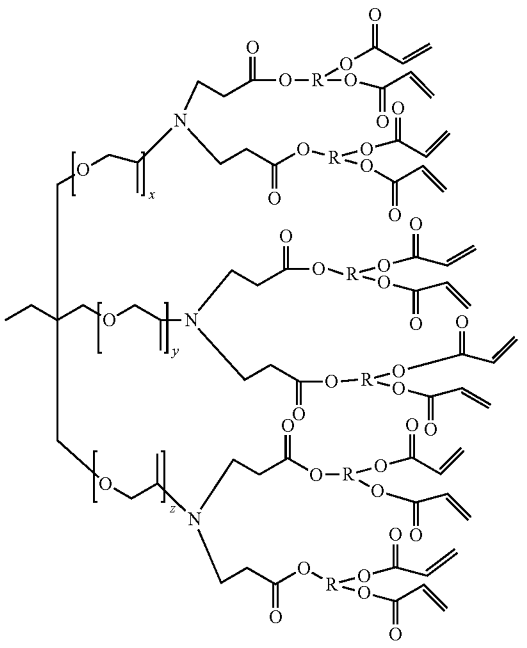

wherein R is a linear or branched alkyl or alkoxy,
wherein m and n may be different or the same,
wherein m and n may each be in a range of from 1 to 100;
wherein x, y, z may be different or the same,
wherein x, y, z may be each in a range of from 1 to 100.

9. The process according to claim 8, wherein the actinic radiation in step (III) is UV light.

10. The process according to claim 8, wherein irradiating with actinic radiation is carried out an irradiation dose of a mean value in the range of from 1 to 25 J/$cm^2$.

11. The process according to claim 8, wherein irradiating with actinic irradiation is carried out at wavelengths greater than 300 nm.

12. The process according to claim 8, wherein the polymeric membrane is selected from polymeric sulfone membranes, polyethylene membranes, polypropylene membranes, polyvinylidene difluoride membranes and polyacrylonitrile membranes.

13. A method for microfiltration, nanofiltration, or ultrafiltration, said method comprising contacting a solution or mixture to be filtered with the polymeric membranes according to claim 1, wherein said method is for water purification, filtration in the production of food, filtration in the production of beverages, filtration in the electronics industry, medical filtration or filtration in the biopharmaceutical industry.

* * * * *